United States Patent
Pippuri

(10) Patent No.: US 8,244,727 B2
(45) Date of Patent: Aug. 14, 2012

(54) METHOD, APPARATUS, AND COMPUTER PROGRAM PRODUCT FOR CONTENT USE ASSIGNMENT BY EXPLOITING SOCIAL GRAPH INFORMATION

(75) Inventor: Sami Pippuri, Bristol (GB)

(73) Assignee: Nokia Corporation, Espoo (FI)

( * ) Notice: Subject to any disclaimer, the term of this patent is extended or adjusted under 35 U.S.C. 154(b) by 534 days.

(21) Appl. No.: 12/129,200

(22) Filed: May 29, 2008

(65) Prior Publication Data

US 2009/0299963 A1 Dec. 3, 2009

(51) Int. Cl.
*G06F 17/30* (2006.01)

(52) U.S. Cl. .................................................... 707/734

(58) Field of Classification Search .................. 707/736, 707/734
See application file for complete search history.

(56) References Cited

U.S. PATENT DOCUMENTS

| | | |
|---|---|---|
| 2006/0052091 A1 | 3/2006 | Onyon et al. |
| 2007/0032267 A1* | 2/2007 | Haitani et al. ............. 455/556.2 |
| 2007/0061336 A1* | 3/2007 | Ramer et al. ..................... 707/10 |
| 2007/0204308 A1* | 8/2007 | Nicholas et al. ................ 725/86 |
| 2008/0040428 A1 | 2/2008 | Wei et al. |
| 2008/0139112 A1* | 6/2008 | Sampath et al. ............. 455/3.04 |
| 2008/0201201 A1* | 8/2008 | Pousti et al. ..................... 705/10 |
| 2008/0235242 A1 | 9/2008 | Swanburg et al. |
| 2008/0294655 A1* | 11/2008 | Picault et al. ................. 707/100 |
| 2008/0300967 A1* | 12/2008 | Buckley et al. ................. 705/10 |
| 2009/0029685 A1* | 1/2009 | Willis ........................ 455/414.1 |
| 2009/0069911 A1* | 3/2009 | Stefik ............................... 700/94 |
| 2009/0086720 A1 | 4/2009 | Westlake |

FOREIGN PATENT DOCUMENTS

| | | |
|---|---|---|
| EP | 1 947 814 A2 | 7/2008 |
| WO | WO 2009/059637 A1 | 5/2009 |
| WO | WO 2009/112072 A1 | 9/2009 |

OTHER PUBLICATIONS

International Search Report and Written Opinion for PCT/FI2009/050411, mailed Oct. 19, 2009.
Office Action for European Application No. 09 754 020.7 dated Feb. 27, 2012.
Chinese Office Action from Chinese Patent Application No. 200980119840.7, dated Nov. 23, 2011.

* cited by examiner

*Primary Examiner* — Jorge A Casanova
(74) *Attorney, Agent, or Firm* — Alston & Bird LLP

(57) ABSTRACT

An apparatus for automatically assigning content information may include a processor. The processor may be configured to receive content information, and identify the usage type and the sub-usage type of the content information. The content information may comprise an indicator for a usage type and a sub-usage type. The processor may be further configured to automatically assign the received content information to the at least one user contact based on the sub-usage type, and to perform a specified function, based on a usage type. Associated methods and computer program products may also be provided. Another method, apparatus, and computer program product for providing content information may also be provided.

26 Claims, 10 Drawing Sheets

LIST OF CONTENT INFORMATION MATCHING OR RELATED TO YOUR CONTACTS

"ERASE/REWIND" (CHORUS OF THE SONG) CAN BE ASSIGNED AS A RINGTONE FOR THE MARKETING GROUP

"ERASE/REWIND" (FIRST VERSE OF SONG) ASSIGNED AS ALERT TONE FOR THE MARKETING GROUP II

"PARANOID" (INTRO OF THE SONG) CAN BE ASSIGNED AS A RINGTONE FOR MOTHER-IN-LAW SPECIAL BUNDLE PRICING: GET A PICTURE SHOWN TOGETHER WITH THE PARANOID CLIP

"DON'T CALL ANYMORE" (ENTIRE SONG) CAN BE ASSIGNED AS RINGBACK TONE FOR TELEMARKETERS

CHESS GAME CAN BE ASSIGNED AS A SHARED APPLICATION FOR THE CHESS CLUB

FIG. 7

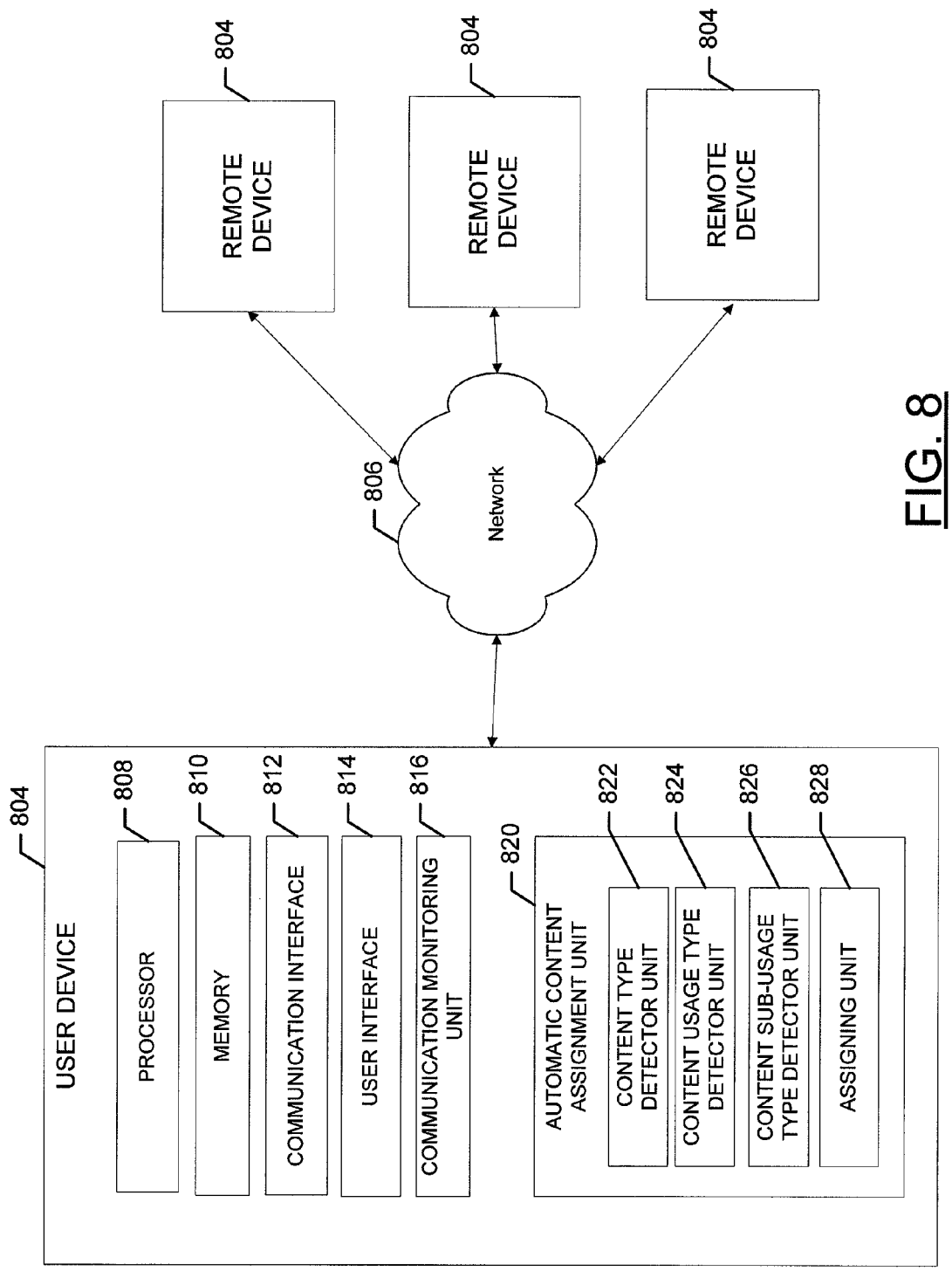

METHOD, APPARATUS, AND COMPUTER PROGRAM PRODUCT FOR CONTENT USE ASSIGNMENT BY EXPLOITING SOCIAL GRAPH INFORMATION

TECHNICAL FIELD

Embodiments of the present invention relate generally to providing and receiving information and, more particularly, relate to a method, apparatus and a computer program product for providing and assigning content information based at least in part on social connections.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information or content transfer along with convenience to users by expanding the capabilities of mobile and other electronic devices (as used herein, "information" and "content" may be used interchangeably). For example, electronic devices, such as, for example, mobile terminals, can access and transfer content information via networking technologies such as the Internet, store, organize and customize a selection of contacts. However, despite the ease of information transfer, the process of customizing contacts or groups, such as, for example, assigning content to contacts or groups of contacts, remains a manual and extensive process, requiring the performance of various steps.

Further, in this information age, there has been a tremendous expansion in the amount of information available to users via networking technologies such as the Internet. In this regard, there has been a tremendous expansion in the providers of content and the monetization of the content, more particularly in the field of mobile communication. However, service providers do not maximize their revenues because they do not always offer the information or content in the proper format. Moreover, the information or content may not always be offered to the proper audience and for the proper setting. Further, the amount of information or content may be overwhelming to the audience and as a result, there may be a loss of sales because the audience may not be able to make a proper decision or make any decision.

In light of the above, it would be desirable to provide mechanisms for automatically assigning information or content to the proper usage and the user's contact(s) or group(s). Further, it would be desirable to provide the relevant information in the appropriate context, and tailoring the provided information or content for use in customizing user contacts.

BRIEF SUMMARY

A method, apparatus and computer program product are therefore provided that may enable providing and automatic assigning of content information based at least in part on social connections. In this regard, example embodiments of the present invention may maintain a selection of content information. The content information may be maintained on a network element, e.g. a server, or the like and may comprise an indicator for a usage type and/or a sub-usage type of the content. Various embodiments may receive user contacts associated with a user. The user contacts may be received from a server, a mobile terminal, or the like. Various embodiments may also query the information to identify social connections between the user contacts and the user. Some embodiments may compare the selection of content information with the social connections of the user contacts to identify content information corresponding to the user contacts. Other embodiments may provide for a transmission of the identified content information.

In one example embodiment, a method for providing content information is described. The method may include maintaining a selection of content information. In various embodiments, the content information may comprise a usage type and/or a sub-usage type, and receive a selection of user contacts associated with a user. The method may further include querying the selection of user contacts to identify social connections associated with the user contacts. In various embodiments, each user contact may have at least one social connection with the user. The method may also include comparing the selection of content information with at least one social connection of at least one user contact to identify content information corresponding to the at least one user contact. The method may additionally include providing for transmission of the at least one identified content information to the user.

In another example embodiment, a computer program product for providing content information is described. The computer program product may include at least one computer-readable storage medium having computer-readable program code portions stored therein. The computer-readable program code portions may include first, second, third, fourth, and fifth program code portions. The first program code portion may be configured to maintain a selection of content information. In various embodiments, the content information may comprise a usage type and/or a sub-usage type, and receive a selection of user contacts associated with a user. The second program code portion may be configured to receive a selection of user contacts associated with a user. The third program code portion may be configured to query the selection of user contacts to identify social connections associated with the user contacts. In various embodiments, each user contact may have at least one social connection with the user. The fourth program code portion may be configured to compare the selection of content information with at least one social connection of at least one user contact to identify content information corresponding to the at least one user contact, and the fifth program code portion may be configured to provide for transmission of the at least one identified content information to the user.

In another example embodiment, an apparatus for providing content information is described. The apparatus may include a processor. The processor may be configured to maintain a selection of content information. In various embodiments, the content information may comprise a usage type and/or a sub-usage type, and receive a selection of user contacts associated with a user. The processor may further be configured to query the selection of user contacts to identify social connections associated with the user contacts. In various embodiments, each user contact may have at least one social connection with the user. The processor may also be configured to compare the selection of content information with at least one social connection of at least one user contact to identify content information corresponding to the at least one user contact, and provide for transmission of the at least one identified content information to the user.

In one example embodiment, an apparatus for providing content information is described. The apparatus may include means for maintaining a selection of content information. In various embodiments, the content information may comprise a usage type and/or a sub-usage type. The apparatus may further include means for receiving a selection of user contacts associated with a user, and means for querying the selection of user contacts to identify social connections associated with the user contacts. In various embodiments, each user contact may have at least one social connection with the user. The apparatus may also include means for comparing the selection of content information with at least one social connection of at least one user contact to identify content information corresponding to the at least one user contact, and means for providing for transmission of the at least one identified content information to the user.

Further example embodiments of the present invention may receive content information to be assigned to at least one user contact. The content information may be received from a server, a mobile terminal or the like and may comprise an indicator for a usage type and/or a sub-usage type. Various embodiments may identify the usage type and/or the sub-usage type of the content information. Other embodiments may automatically assign the received content information to the user contact(s), based at least in part on the sub-usage type, to perform a specified function, based at least in part on the usage type. As used herein, the term "automatically" may be used to refer to without manual intervention or involvement. In other embodiments, manual user intervention may be possible.

In one example embodiment, a method for automatically assigning content information is described. The method may include receiving at least one content information comprising an indicator for a usage type and/or a sub-usage type to be assigned to at least one user contact, and identifying the usage type and/or the sub-usage type of the at least one content information. The method may further include automatically assigning the received at least one content information to the at least one user contact, based at least in part on the sub-usage type, to perform a specified function, based at least in part on a usage type.

In another example embodiment, a computer program product for automatically assigning content information is described. The computer program product may include at least one computer-readable storage medium having computer-readable program code portions stored therein. The computer-readable program code portions may include a first, second, and third program code portions. The first program code portion may be configured to receive at least one content information to be automatically assigned to at least one user contact. In various embodiments, the content information may comprise an indicator for a usage type and/or a sub-usage type. The second program code portion may be configured to identify the usage type and/or the sub-usage type of the at least one content information. The third program code portion may be configured to automatically assign the received at least one content information to the at least one user contact, based at least in part on the sub-usage type, to perform a specified function, based at least in part on a usage type.

In another example embodiment, an apparatus for automatically assigning content information is described. The apparatus may include a processor. The processor may be configured to receive at least one content information, and identify the usage type and/or the sub-usage type of the at least one content information. In various embodiments, the content information may comprise an indicator for a usage type and/or a sub-usage type. The processor may be further configured to automatically assign the received at least one content information to the at least one user contact based at least in part on the sub-usage type, to perform a specified function, based at least in part on a usage type.

In one example embodiment, an apparatus for automatically assigning content information is described. The apparatus may include means for receiving at least one content information, and means for identifying the usage type and/or the sub-usage type of the at least one content information. The apparatus may further include means for automatically assigning the received at least one content information to the at least one user contact, based at least in part on the sub-usage type, to perform a specified function, based at least in part on a usage type.

BRIEF DESCRIPTION OF THE DRAWING(S)

Having thus described the invention in general terms, reference will now be made to the accompanying drawings, which are not necessarily drawn to scale, and wherein:

Figure 9:
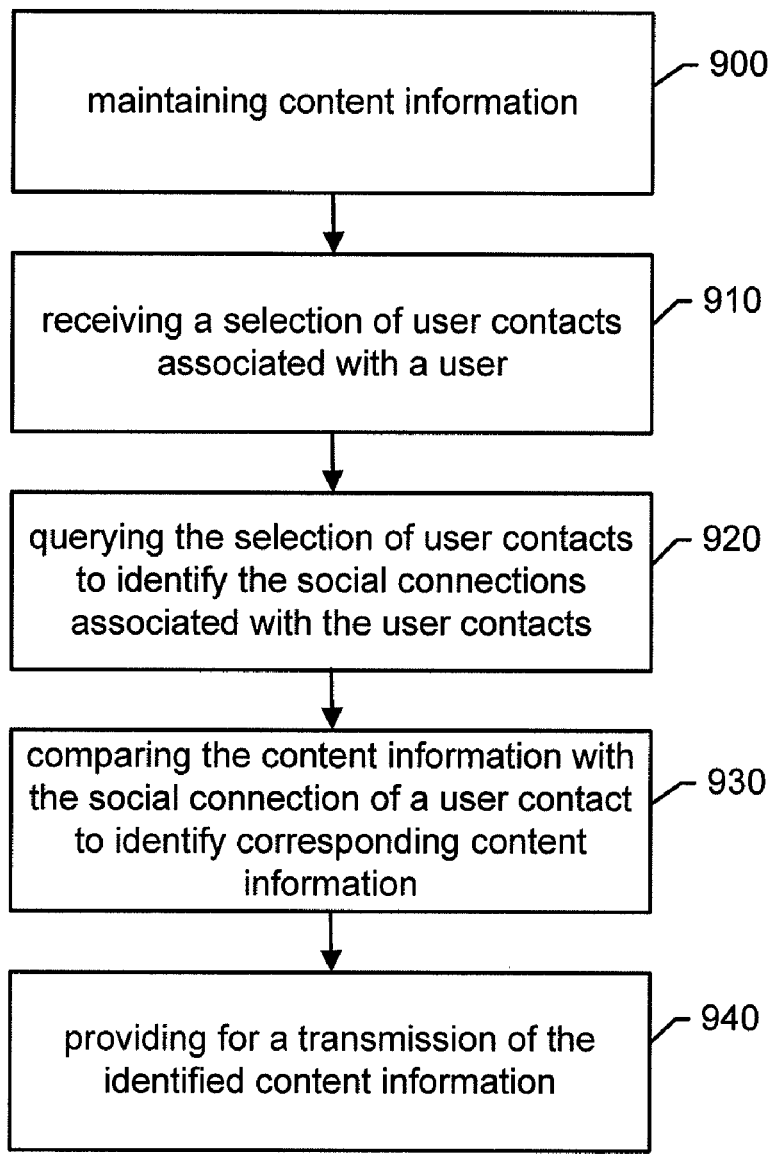
Figure 10:
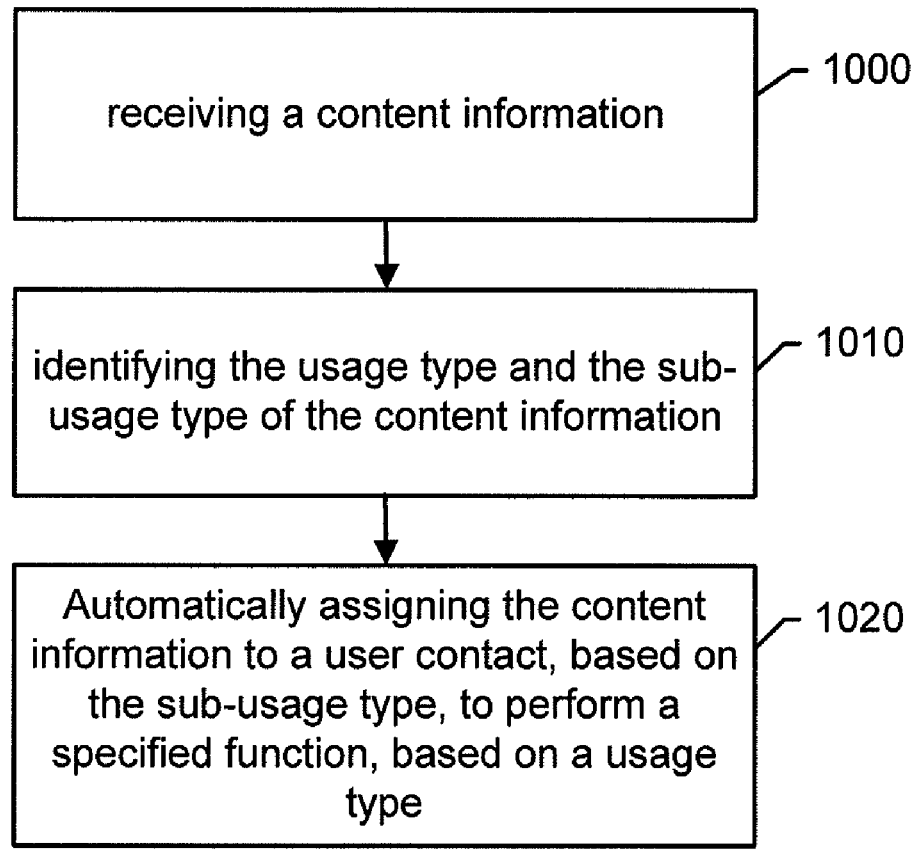

FIG. 7 illustrates an example selection of content information according to example embodiments of the present invention FIG. 8 illustrates a block diagram of a system for automatically assigning content information according to an example embodiment of the present invention; and FIGS. 9 and 10 are flowcharts according to example methods for providing and automatically assigning content information according to example embodiments of the present invention

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Figure 1:
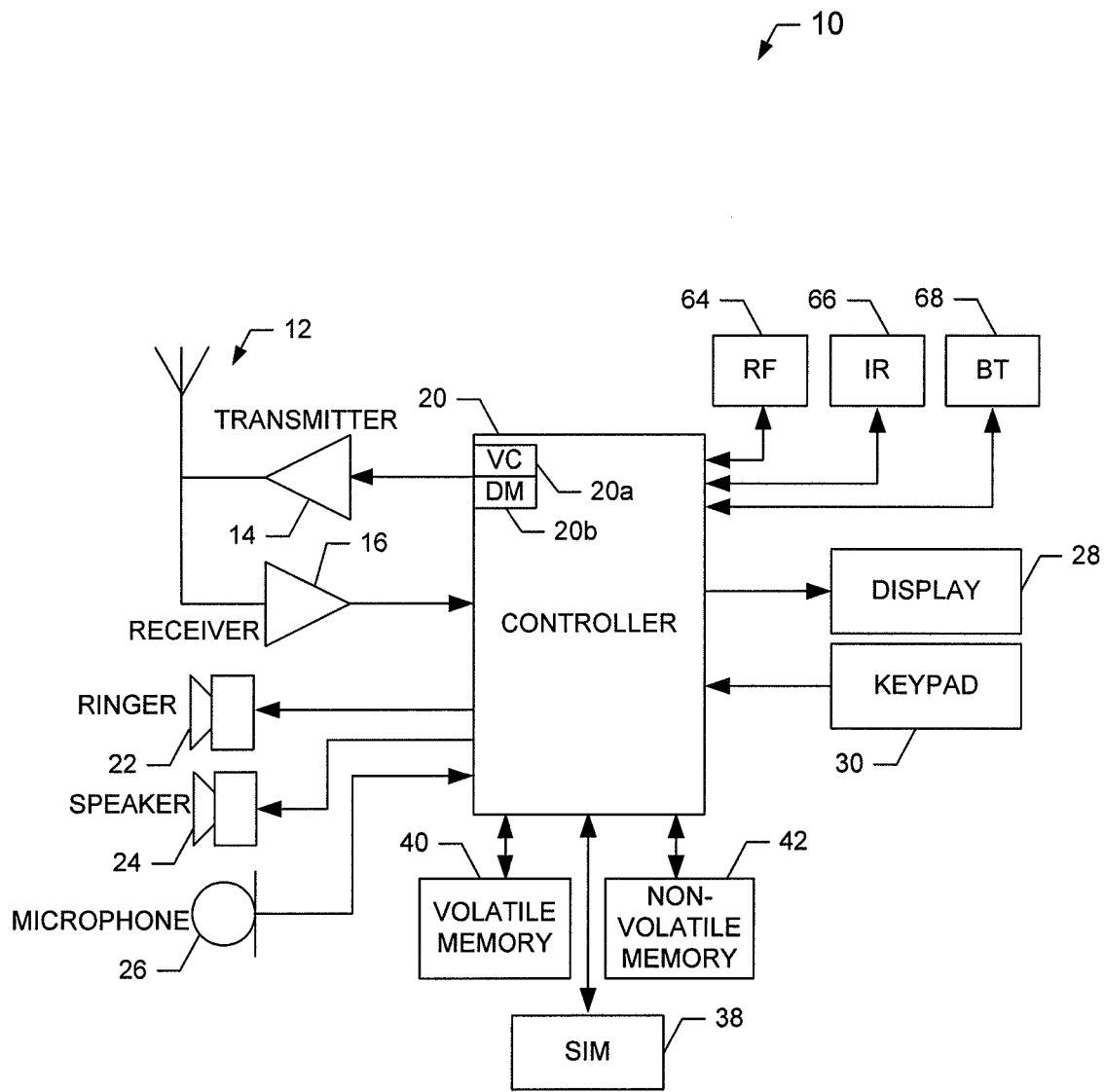
FIG. 1 is a schematic block diagram of a mobile terminal according to an example embodiment of the present invention.

FIG. 1 illustrates a block diagram of a mobile terminal 10 that may benefit from embodiments of the present invention. It should be understood, however, that the mobile terminal illustrated and hereinafter described is merely illustrative of one type of electronic device that may benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ the present invention.

As shown, the mobile terminal 10 may include an antenna 12 in communication with a transmitter 14 and a receiver 16. The mobile terminal may also include a controller 20 or other processor that provides signals to and receives signals from the transmitter and receiver, respectively. These signals may include signaling information in accordance with an air interface standard of an applicable cellular system, and/or any number of different wireless networking techniques, comprising but not limited to Wireless-Fidelity (Wi-Fi), wireless LAN (WLAN) techniques such as IEEE 802.11, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, and/or the like. For example, the mobile terminal may be capable of operating in accordance with 2G wireless communication protocols IS-136 (TDMA), GSM, and IS-95 (CDMA). Also, for example, the mobile terminal may be capable of operating in accordance with 2.5G wireless communication protocols GPRS, EDGE, or the like. Further, for example, the mobile terminal may be capable of operating in accordance with 3G wireless communication protocols such as UMTS, CDMA2000, WCDMA and TD-SCDMA. The mobile terminal may be additionally capable of operating in accordance with 3.9G wireless communication protocols such as LTE or E-UTRAN. Additionally, for example, the mobile terminal may be capable of operating in accordance with fourth-generation (4G) wireless communication protocols or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) protocols.

It is understood that the controller 20 may comprise the circuitry desirable for implementing audio and logic functions of the mobile terminal 10. For example, the controller 20 may comprise a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20a, an internal data modem (DM) 20b, and/or the like. Further, the controller may comprise functionality to operate one or more software programs, which may be stored in memory. For example, the controller 20 may be capable of operating a connectivity program, such as a Web browser. The connectivity program may allow the mobile terminal 10 to transmit and receive Web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive Web content across Internet 50.

The mobile terminal 10 may also comprise a user interface including a conventional earphone or speaker 24, a ringer 22, a microphone 26, a display 28, a user input interface, and/or the like, which may be coupled to the controller 20. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise conventional numeric (0-9) and related keys (#, *), and/or other keys for operating the mobile terminal.

As shown in FIG. 1, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example an infrared (IR) transceiver 66, a Bluetooth™ (BT) transceiver 68 operating using Bluetooth™ brand wireless technology developed by the Bluetooth™ Special Interest Group, and/or the like. The Bluetooth transceiver 68 may be capable of operating according to Wibree™ radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory such that the computer readable storage medium is a non-transitory memory medium. In this regard, the mobile terminal may comprise volatile memory 40, such as volatile Random Access Memory (RAM), which may comprise a cache area for temporary storage of data. The mobile terminal may comprise other non-volatile memory 42, which may be embedded and/or may be removable. The non-volatile memory may comprise an EEPROM, flash memory, and/or the like. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 2:
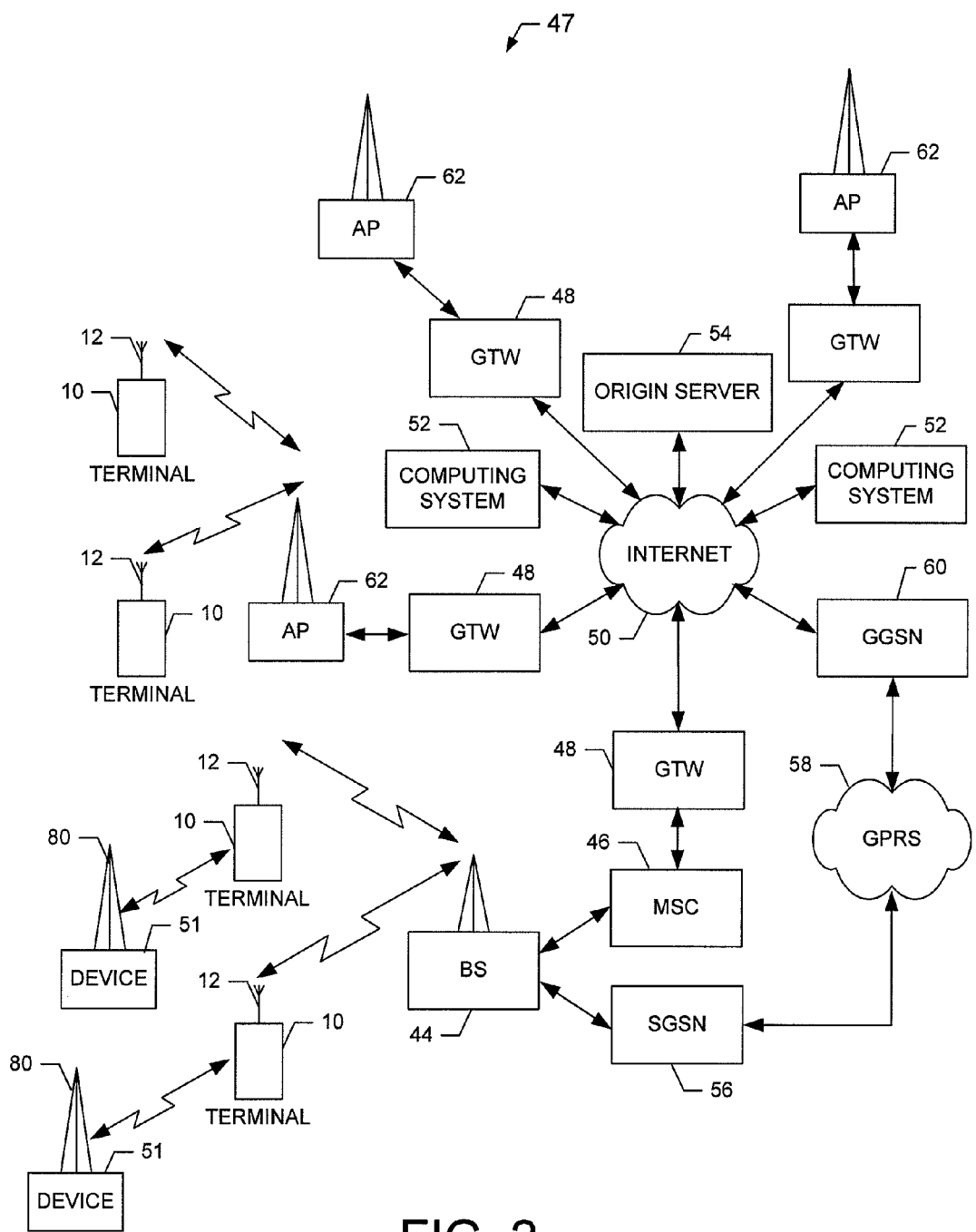
FIG. 2 is a schematic block diagram of a wireless communications system according to an example embodiment of the present invention.

Referring now to FIG. 2, an illustration of one type of system that could support communications to and from an electronic device, such as the mobile terminal of FIG. 1, is provided by way of example, but not of limitation. As shown, one or more mobile terminals 10 may each include an antenna 12 for transmitting signals to and for receiving signals from a base site or base station (BS) 44. The base station 44 may be part of one or more cellular or mobile networks each of which may comprise elements desirable to operate the network, such as a mobile switching center (MSC) 46. In operation, the MSC 46 may be capable of routing calls to and from the mobile terminal 10 when the mobile terminal 10 is making and receiving calls. The MSC 46 may also provide a connection to landline trunks when the mobile terminal 10 is involved in a call. In addition, the MSC 46 may be capable of controlling the forwarding of messages to and from the mobile terminal 10, and may also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network or a network employing an MSC.

The MSC 46 may be coupled to a data network, such as a local area network (LAN), a metropolitan area network (MAN), and/or a wide area network (WAN). The MSC 46 may be directly coupled to the data network. In one embodiment, however, the MSC 46 may be coupled to a gateway (GTW) 48, and the GTW 48 may be coupled to a WAN, such as the Internet 50. In turn, devices such as processing elements (e.g., personal computers, server computers or the like) may be coupled to the mobile terminal 10 via the Internet 50. For example, as explained below, the processing elements may include one or more processing elements associated with a computing system 52 (two shown in FIG. 2), origin server 54 (one shown in FIG. 2) or the like, as described below.

As shown in FIG. 2, the BS 44 may also be coupled to a signaling General Packet Radio Service (GPRS) support node (SGSN) 56. As known to those skilled in the art, the SGSN 56 may be capable of performing functions similar to the MSC 46 for packet switched services. The SGSN 56, like the MSC 46, may be coupled to a data network, such as the Internet 50. The SGSN 56 may be directly coupled to the data network. Alternatively, the SGSN 56 may be coupled to a packet-switched core network, such as a GPRS core network 58. The packet-switched core network may then be coupled to another GTW 48, such as a GTW GPRS support node (GGSN) 60, and the GGSN 60 may be coupled to the Internet 50. In addition to the GGSN 60, the packet-switched core network may also be coupled to a GTW 48. Also, the GGSN 60 may be coupled to a messaging center. In this regard, the GGSN 60 and the SGSN 56, like the MSC 46, may be capable of controlling the forwarding of messages, such as NMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown in FIG. 2 and described herein, it should be appreciated that electronic devices, such as the mobile terminal 10, may be coupled to one or more of any of a number of different networks through the BS 44. In this regard, the network(s) may be capable of supporting communication in accordance with any one or more of a number of first-generation (1G), second-generation (2G), 2.5G, third-generation (3G), fourth generation (4G) and/or future mobile communication protocols or the like. For example, one or more of the network(s) may be capable of supporting communication in accordance with 2G wireless communication protocols IS-136 (TDMA), GSM, and IS-95 (CDMA). Also, for example, one or more of the network(s) may be capable of supporting communication in accordance with 2.5G wireless communication protocols GPRS, Enhanced Data GSM Environment (EDGE), or the like. Further, for example, one or more of the network(s) may be capable of supporting communication in accordance with 3G wireless communication protocols such as E-UTRAN or a Universal Mobile Telephone System (UMTS) network employing Wideband Code Division Multiple Access (WCDMA) radio access technology. NAMPS, as well as TACS, network(s) may also benefit from embodiments of the present invention, as should dual or higher mode mobile terminals (e.g., digital/analog or TDMA/CDMA/analog phones).

As depicted in FIG. 2, the mobile terminal 10 may further be coupled to one or more wireless access points (APs) 62. The APs 62 may comprise access points configured to communicate with the mobile terminal 10 in accordance with techniques such as, for example, radio frequency (RF), Bluetooth™ (BT), infrared (IrDA) or any of a number of different wireless networking techniques, including wireless LAN (WLAN) techniques such as IEEE 802.11 (e.g., 802.11a, 802.11b, 802.11g, 802.11n, etc.), Wibree™ techniques, WiMAX techniques such as IEEE 802.16, Wireless-Fidelity (Wi-Fi) techniques and/or ultra wideband (UWB) techniques such as IEEE 802.15 or the like. The APs 62 may be coupled to the Internet 50. Like with the MSC 46, the APs 62 may be directly coupled to the Internet 50. In one embodiment, however, the APs 62 may be indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 may communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored. Thus, use of any such terms should not be taken to limit the spirit and scope of the present invention.

Although not shown in FIG. 2, in addition to or in lieu of coupling the mobile terminal 10 to computing systems 52 and/or origin server 54 across the Internet 50, the mobile terminal 10, computing system 52 and origin server 54 may be coupled to one another and communicate in accordance with, for example, RF, BT, IrDA or any of a number of different wireline or wireless communication techniques, including LAN, WLAN, WiMAX, Wireless Fidelity (Wi-Fi), Wibree™, UWB techniques and/or the like. One or more of the computing systems 52 may additionally, or alternatively, include a removable memory capable of storing content, which may thereafter be transferred to the mobile terminal 10. Further, the mobile terminal 10 may be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, Wibree™, Wi-Fi, WLAN, WiMAX and/or UWB techniques. In this regard, the mobile terminal 10 may be capable of communicating with other devices via short-range communication techniques. For instance, the mobile terminal 10 may be in wireless short-range communication with one or more devices 51 that are equipped with a short-range communication transceiver 80. The electronic devices 51 may comprise any of a number of different devices and transponders capable of transmitting and/or receiving data in accordance with any of a number of different short-range communication techniques including but not limited to Bluetooth™, RFID, IR, WLAN, Infrared Data Association (IrDA) or the like. The electronic device 51 may include any of a number of different mobile or stationary devices, including other mobile terminals, wireless accessories, appliances, portable digital assistants (PDAs), pagers, laptop computers, motion sensors, light switches and other types of electronic devices.

Figure 3:
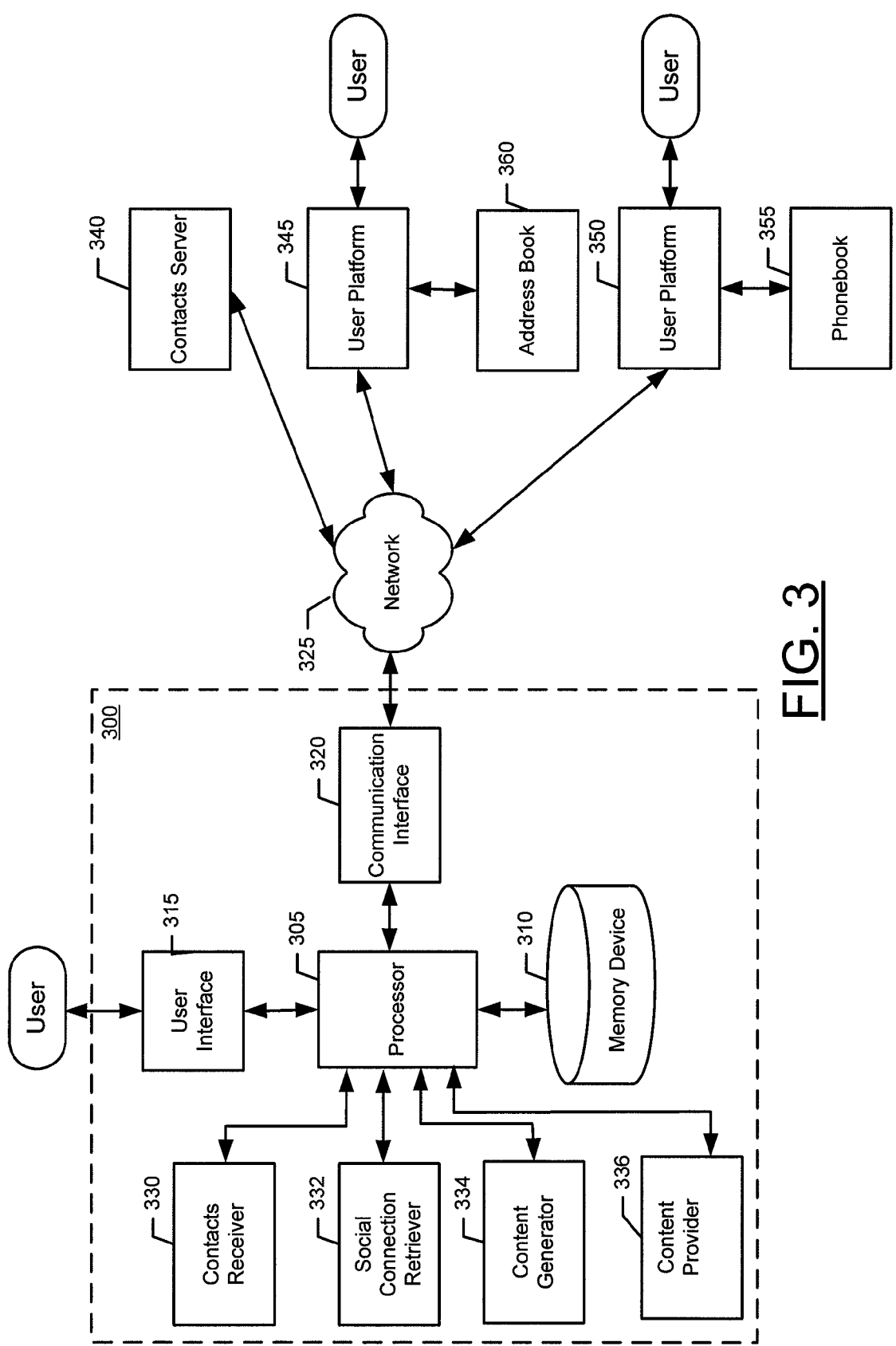
FIG. 3 illustrates a block diagram showing an apparatus for providing content with associated network connectivity according to an example embodiment of the present invention.

Referring now to FIG. 3, an example apparatus 300 for providing service invitations is described. Apparatus 300 may be embodied as a network element, e.g. a server, or other network device including, for example, a mobile terminal, such as mobile terminal 10 of FIG. 1. The apparatus 300 may include or otherwise be in communication with a processor 305, a user interface 315, a communication interface 320, and a memory device 310. The memory device 310 may include, for example, volatile and/or non-volatile memory (e.g., volatile memory 40 and/or non-volatile memory 42). The memory device 310 may be accessed via a local network, or available remotely. In other embodiments, the memory device 310 may be separate from apparatus 300 but may be accessed by apparatus 300 via a local network, or available remotely. The memory device 310 may be configured to store information, data, applications, instructions, or the like for enabling the apparatus to carry out various functions in accordance with example embodiments of the present invention. For example, the memory device 310 could be configured to buffer input data for processing by the processor 305. Additionally or alternatively, the memory device 310 could be configured to store instructions for execution by the processor 305. As yet another alternative, the memory device 310 may be one of a plurality of databases that store information in the form of static and/or dynamic information, for example, in association with user contacts, a selection of content information that is to be provided to the user, or the like.

The processor 305 may be embodied in a number of different ways. For example, the processor 305 may be embodied as a microprocessor, a coprocessor, a controller (e.g., controller 30 from FIG. 1), or various other processing means or elements including integrated circuits such as, for example, an ASIC (application specific integrated circuit) or FPGA (field programmable gate array). In an example embodiment, the processor 305 may be configured to execute instructions stored in the memory device 310 or otherwise accessible to the processor 305.

The user interface 315 may be in communication with the processor 305 to receive an indication of a user input at the user interface 315 and/or to provide an audible, visual, mechanical, or other output to the user. As such, the user interface 315 may include, for example, a keyboard, a mouse, a joystick, a touch screen display, a conventional display, a microphone, a speaker, or other input/output mechanisms. In an example embodiment in which the apparatus 300 is embodied as a server, the user interface 315 may be limited, or even eliminated.

The communication interface 320 may be embodied as any device or means embodied in either hardware, software, or a combination of hardware and software that is configured to receive and/or transmit data from/to a network and/or any other device or module in communication with the apparatus 300. In this regard, the communication interface 320 may include, for example, an antenna, a transmitter, a receiver, a transceiver, a network card, network adapter, network interface card and/or supporting hardware or software for enabling communications with network 325, which may be any type of wired or wireless network. The communication interface 320 may enable the receipt and transmission of communications with remote devices (e.g., the contacts server 340, the user platform 345, and/or the user platform 350, or the like). As used herein, "communications" and "communication events" may be used interchangeably and may include, but are not limited to, phone calls, short message service (SMS) messages, multimedia messaging service (MMS) messages, e-mails, Internet Protocol communication and/or the like, and transfer or other sharing of files between the apparatus 300 and the remote devices. Sometimes as used herein, the generic term "messages" may be used to refer to SMS messages, MMS messages, e-mails, and file transfers. As such, via the communication interface 320 and the network 325, the apparatus 300 may communicate with the contacts server 340, the user platform 345, and/or the user platform 350.

The contacts server 340 may be any type of computing device for storing, retrieving, computing, transmitting, and receiving data. The contacts server 340 may include a memory device, a processor, and a communication interface for communicating with the network 325. In some embodiments, the contacts server 340 may be a web server, database server, file server, or the like. According to various embodiments, the contacts server 340 may be a storage location for user contacts. In this regard, a user may upload one or more user contacts to the contacts server 340 via, for example, network 325. For example, one or more user contacts associated with the user platform 345 and/or the user platform 350 may be uploaded to the contact server 340 via network 325. Conversely, a user may update one or more user contacts maintained on the contacts server 340 via, for example, network 325, and download/transfer to the user platform 345, via, for example, network 325. For example, user contacts associated with the user platform 345 and/or the user platform 350 maintained on the contacts server 340 may be updated and then downloaded back to the user platform 345 and/or the user platform 350. Similarly, a user may exchange or share one or more user contacts with another user, using respective user platforms 345 and 350, in other words uploading or updating one or more user contacts between the user platforms, via, for example, network 325. As such, and as described below, one or more user contacts may be synchronized with, for example, contacts server 340 and/or between user platforms 345 and/or 350. Further, one or more user contacts may be received from the contacts server 340 by various network entities including apparatus 300.

The user platforms 345, 350 may also be any type of device for storing, retrieving, computing, transmitting and receiving data. In some embodiments, user platforms 345, 350 may be embodied as a mobile terminal 10 of FIG. 1 or the like. User platforms may be associated with one or more user contacts such that a user contact may be used to direct communications to the user platforms and a user of the user platform. In some embodiments, user contacts may direct communications to a central holding location (e.g., a server) that may be accessed by a user via user platforms 345, 350. For example, email may be directed by a user contact to a server for holding until a user can access the server via a user platform and retrieve the email. In the alternative, email may be directed to a server holding by a user contact and subsequent transferred to a user platform. User platforms 345, 350 are representative of a plurality of user platforms, and as such any number of user platforms may be included in FIG. 3. In some embodiments, via the user platforms 345, 350, a user may access an example online service such as, but not limited to, a website, a social networking website, a blog website, a web feed, a widget, or the like, using a browser, a dedicated application, or the like.

User platform 350, as well as any other user platform, may also be associated with a phonebook 355. The phonebook 355 may include data including user contacts and additional associated information. The phonebook 355 may be stored on a memory device that is included with the user platform 355 or external to the user platform 350, similar to contact server 340. As described below, the data within the phonebook 355 may be synchronized with, for example, contacts server 340. Similarly, user platform 345, as well as any other user platform, may also be associated with an address book 360.

The contact receiver 330, the social connection retriever 332, the content generator 334 and the content provider 336 of apparatus 300 may be any means or device embodied in hardware, software, or a combination of hardware and software that is configured to carry out the functions of the contact receiver 330, the social connection retriever 332, the content generator 334 and the content provider 336, respectively, as described herein. In an example embodiment, the processor 305 may include, or otherwise control the contact receiver 330, the social connection retriever 332, the content generator 334 and the content provider 336. In various example embodiments, the contact receiver 330, the social connection retriever 332, the content generator 334 and the content provider 336 may reside on a server, or other network device including a mobile terminal, such as mobile terminal 10 of FIG. 1.

In some embodiments, the system of FIG. 3 may be utilized for synchronization of data amongst the various network platforms. In this regard, the network platforms (i.e., the apparatus 300, the contacts server 340, the user platforms 345, 350, etc.) may be used by a user to access data. In some embodiments, the network platforms may be used to access data associated with an online service account. Any type of data may be synchronized amongst the platforms and made available for access. Types of data may include status information, content, user profile information, shared files and applications (e.g., documents, photos, media content, etc.), user contacts, invitations, service membership information, relationship group information, or the like. For example, a contacts list may be accessed and/or synchronized (e.g., updated) via the user platforms 345, 350, the contact server 340, or the apparatus 300. Upon modifying the contacts list, the information or part of the information may be transmitted to a data storage device (e.g., the apparatus 300 or the contact server 340) or otherwise made available to the various network platforms for subsequent access.

In this manner, data modified on one platform may be available to another platform. For example, the modified contact information may be automatically transmitted from the user platform 345 to the contact server 340 or the apparatus 300 for synchronization purposes. As such, the user may later access the modified contact information via user platform 350 and/or a browser.

In some embodiments, a user may set synchronization parameters, which may identify types of data that may be synchronized and types of data that need not be synchronized. For example, a user may set the synchronization parameters to synchronize the contact list, but may also set the synchronization parameters such that user profile information need not be synchronized. In various embodiments, various user contacts, invitations, service membership information, and/or relationship group information and/or additional associated information may or may not be synchronized.

Figure 4:
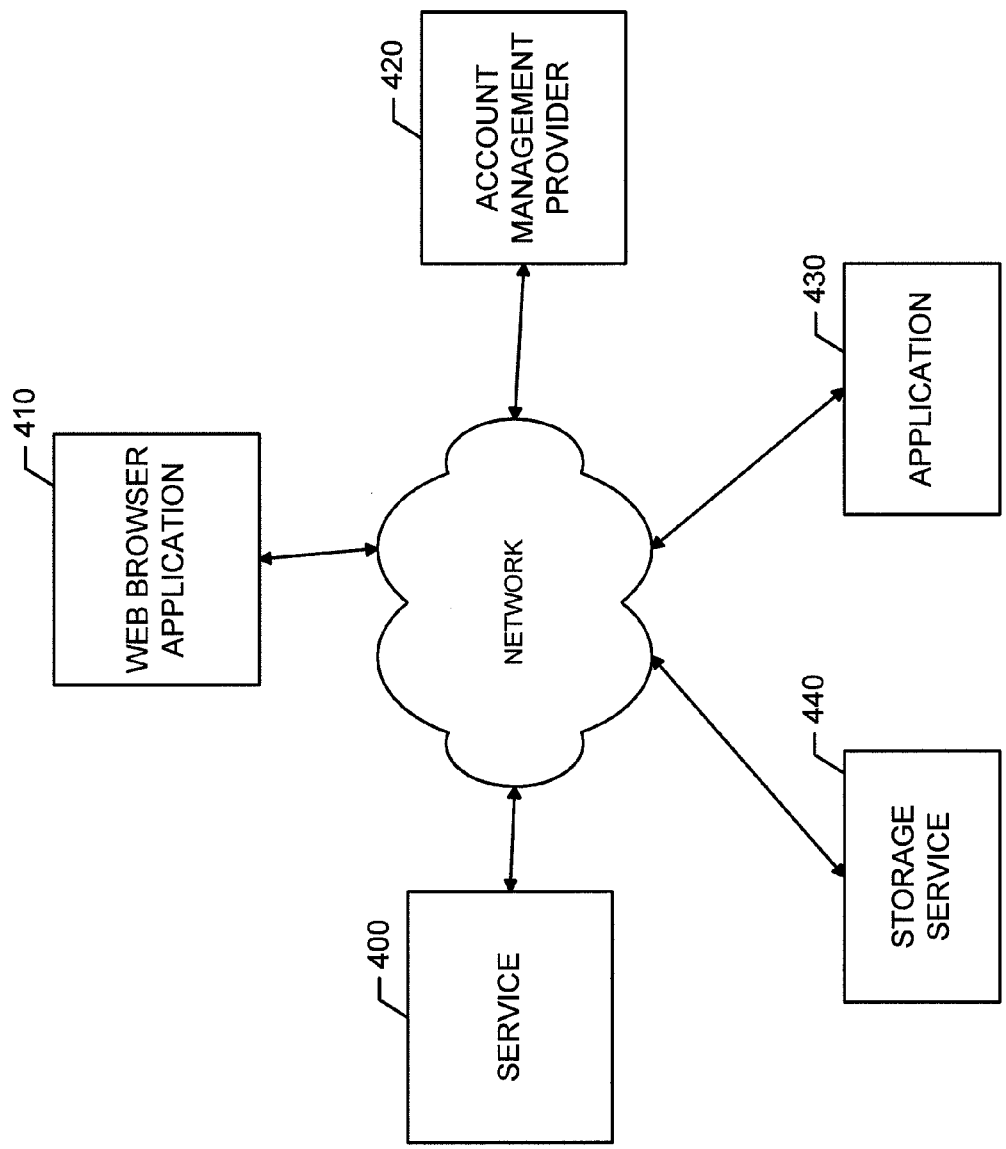
FIG. 4 illustrates an example system of network entities according to example embodiments of the present invention.

In this regard, and referring now to FIG. 4, an example embodiment of a system. The system of FIG. 4 includes a service 400, a web browser application 410, an account management provider 420, an application 430, and a storage service 440. The service 400, the web browser application 410, the account management provider 420, the application 430, and the storage service 440 may be interconnected via the illustrated network, which may operate in similar manner to network 325.

The service 400, the account management provider 420, and the storage service 440 may collectively represent an embodiment of the apparatus 300 of FIG. 3. In this regard, the service 400 may represent an internet or network service (e.g., a website, a social networking website, a blog website, a web feed, a widget, or the like) that may receive and interact with user contacts and/or the like in a manner described with respect to the contact receiver 330, the social connection retriever 332, the content generator 334, the content provider 336, and the processor 305. The service 400 may be a content provider service and hence, mainly provide content services to user platforms. In other embodiments, the service 400 may be associated with a third party service provider such as, for example, a content service provider (e.g., a ringtone provider, a video ringtone provider, a screen saver or wallpaper provider, a theme provider, or the like), to provide content information to user platforms, as discussed below, in addition to other functionalities specific to the service 400. As used herein, "information", "content", and "content information" may be used interchangeably to refer to ringtones, ringback tones, themes, wallpapers, screen savers, pictures, video, games or other applications, and/or the like. For example, a social networking website may, in addition to its social networking functionalities, provide ringtones, video ringtones, screen saver, wallpaper or the like, on a side bar/pane or an advertising section/pane of the site.

Figure 5:
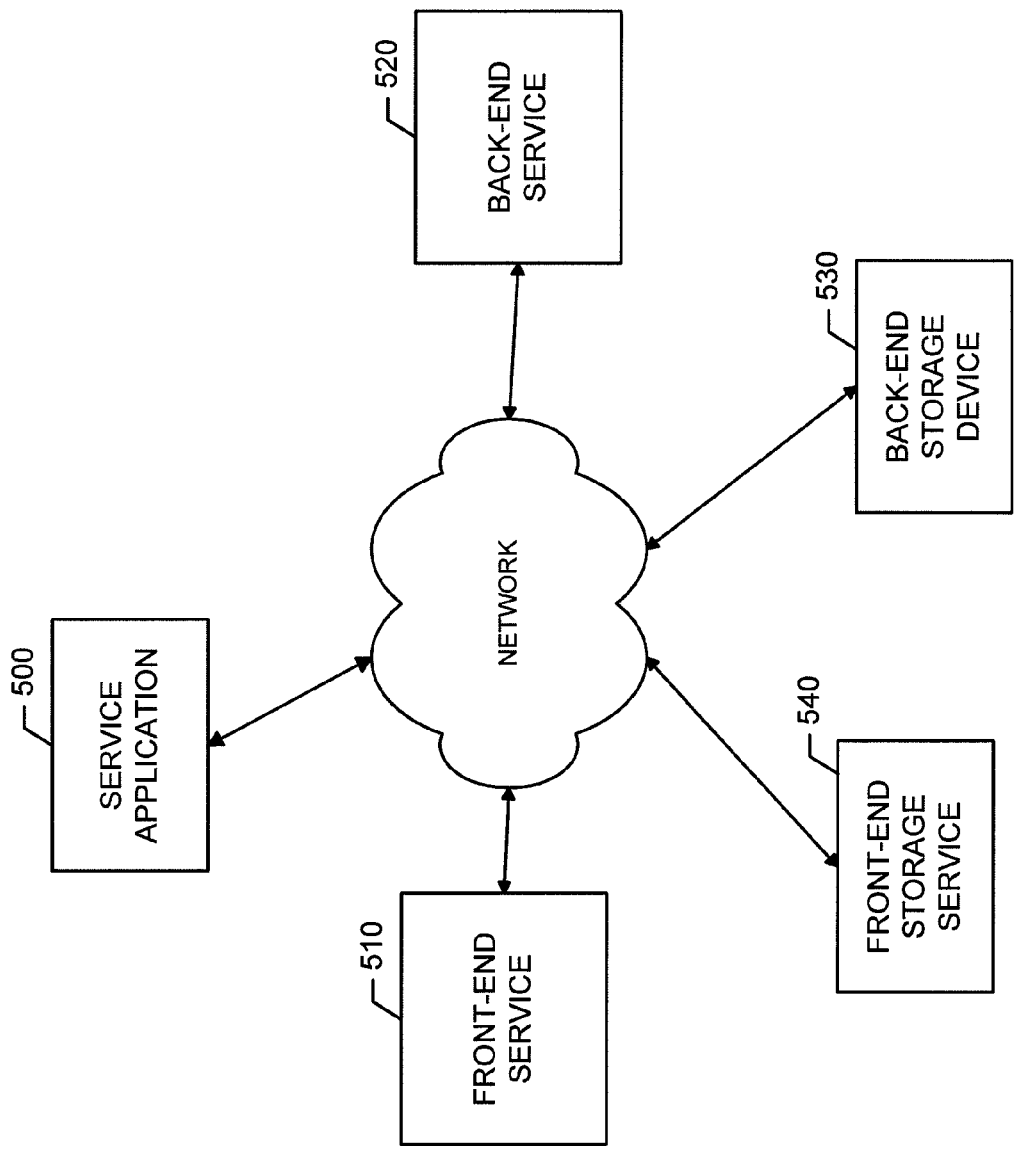
FIG. 5 illustrates another example system of network entities according to example embodiments of the present invention.

In this regard, and referring now to FIG. 5, an embodiment of a system in accordance with aspects of the present invention is illustrated. The system of FIG. 5 may include a service application 500, a front-end service 510, a back-end service 520, a back-end storage device 530, and a front-end storage service 540. As such, the service application 500, the front-end service 510, the back-end service 520, the back-end storage device 530, and the front-end storage device 540 may collectively represent an embodiment of the service 400. The service application 500, the front-end service 510, the back-end service 520, the back-end storage device 530, and the front-end storage device 540 may be interconnected via the illustrated network, which may operate in similar manner to network 325. The front-end service 510 and the back-end service 520, the back-end storage device 530 and the front-end storage device 540, and the service application 500 may operate in similar manner to the service 400, the storage device 440, and the client application 430, respectively, as discussed herein.

Via the service application 500, the front-end service 510 and the back-end service 520 may interact with each other to send and receive data, such as user contacts, content information, etc. The service application 500 may also include authentication means to provide security features during the interaction between the front-end service 510 and the back-end service 520. For example, the back-end service 520 may authenticate itself before exchanging information and/or access information maintained on the front-end storage device 540, and vice versa. Upon verification, the back-end service may be provided with access to, and allowed to exchange information with the front-end service 510, and vice versa. In some embodiments, the back-end storage device 530 and the front-end storage device 540 may be embodied in one storage device that may operate in similar manner to the storage device 440.

Referring back to FIG. 4, various types of data, such as, but not limited to, one or more user contacts, may be synchronized with and/or otherwise transferred to and from the service 400. The service 400 may utilize the storage service 440 for storage and retrieval of data by the service 400. In various embodiments, the storage service 440 may operate in similar manner to the memory device 310 and/or the server 340. Further, the account management provider 420 may operate together with the various other network entities to perform account management and security features. In some embodiments, login information and passwords may be directed to the account management provider 420 for verification. Upon verification, the account management provider 420 may provide access to, and allow communications between, various network entities using, for example, a token or other access key.

Client application 430 may be a software or hardware application residing and operating on a platform, such as a computer, mobile terminal, or the like, that may be used to interact with the service 400. In some embodiments, the client application 430 may reside and operate on the apparatus 300, the user platforms 345, 350, or the like, and may operate in similar manner to apparatus 300, the user platforms 345, 350, or the like. The client application may be downloaded to and/or installed on the platform. In some embodiments, the client application 430 may be specifically tailored to interact with the service 400. Via the client application 430, the platform, and the user of the platform, may interact with the service 400 to send and receive data, such as user contacts, between the client application 430 and the service 400. The client application 430 may facilitate the gathering and/or storage of usage attributes and/or user contacts for subsequent transmission to the service 400.

Further, the application 430 may include an authentication means to provide security features during the interaction with the service 400. The authentication means may include processor 305, the service 400, the web browser application 410, the account management provider 420, the application 430, computer instructions or algorithms described herein and executed by one or more of the foregoing components to perform authentication when executed, and/or the like. For example, the apparatus 300 may authenticate itself before exchanging information and/or accessing information maintained on the user platform 345 and/or the user platform 350 and/or the contact server 340, such as, but not limited to the user contacts, phonebook and/or address book, and additional associated information such as, but not limited to, phone calls log, emails and/or other communications log or the like. Upon verification, the apparatus 300 may be provided with access to, and allowed to exchange between and access information on the user platform 345 and/or the user platform 350 and/or the contact server 340, and various network entities using, for example, a token or other access key Similar to the application 430, the web browser application 410 may be a software or hardware application residing and operating on a platform, such as a computer, mobile terminal, or the like, that may be used to interact with the service 400. In this regard, the web browser application 410 may be a network communication application for interacting with various network entities, including the service 400. In some embodiments, the web browser application 410 may reside and operate on the apparatus 300, the user platforms 345, 350, or the like, and may operate in similar manner to the apparatus 300, the user platforms 345, 350, or the like. Via the web browser application 410, the platform, and the user of the platform, may interact with the service 400 to send and receive, as well as synchronize, data, such as usage attributes, between the web browser application 410 and the service 400. The web browser application 410 may facilitate the gathering and storage of usage attributes for subsequent transmission to the service 400. The web browser application 410 may also facilitate the retrieving and storage of the plurality of user contacts and additional associated information, as discussed. For example, a user may browse to the service 400, using the user platforms 345, 350, whereupon, the service 400 may request to access the phonebook 355 and/or address book 360, which may include data including user contacts and additional associated information such as, but not limited to, phone communication logs, short message service (SMS) message logs, multimedia messaging service (MMS) message logs, e-mail logs, file sharing logs, application sharing and execution logs, VoIP (Voice over Internet Protocol) logs, instant messaging logs, other communication events log and/or the like. Further, and as mentioned above, the interaction of the platform or the user thereof with the service 400 may be regulated by an authentication means.

Referring back to FIG. 3, the contact receiver 330 may be configured to receive user contacts associated with a user. Means for receiving the user contacts may include the processor 305, the contact receiver 330, a receiver, algorithms for receiving the user contacts described herein and executed by one or more of the foregoing components, and/or the like. Means for receiving the user contacts may further include a contact retriever (not shown). In one embodiment, the contact retriever may be separate from the contact receiver. Means for retrieving the user contacts may include processor 305, the contact receiver 330, such as, but not limited to, a retriever, algorithms for retrieving the user contacts described herein and executed by one or more of the foregoing components, and/or the like. In this regard, the retriever means may be embodied by software written in a network application programming language or the like that exposes a user contacts application, such as, but not limited to, a phonebook and/or address book application program interface, in order to access the user contacts associated with the user and other content of the phonebook or additional information associated thereto. The network application programming language may comprise, but is not limited to, JavaScript, Java Server Pages (JSP), PHP, Perl, Active Server Pages (ASP), and Visual Basic (VB) Script or the like. Further, other programming languages may be used.

The contact receiver 330 or the processor 305 may be configured to store the plurality of user contacts and other additional information, as discussed above, on the memory device 310. In other embodiments, the contact receiver 330 or the processor 305 may be configured not to store the plurality of user contacts and other additional associated information but may be configured to identify the plurality of user contacts associated with the user and other additional associated information. The plurality of user contacts and other additional information may already be organized in particular data structure format and stored in the memory device 310. In another embodiment, the plurality of user contacts and other additional information may be organized in a different data structure preferable to the apparatus 300 by, for example, the network application programming language, before being stored on the memory device 310. A user contact may include information for directing communications to a user contact entity (e.g., an individual or other entity). In this regard, information for directing communications to a user contact entity may include a phone number, a mailing address, an email address, a user identifier, a social networking account identifier, social networking account relation to the user (friends, family, business contact, etc.), a network account identifier or the like. A user may be associated with a list or other grouping of user contacts. The plurality of user contacts associated with a user may be representative of the user's friends, family members, business contacts, work associates, and/or other groups (e.g., work out friends, chess club, book club, and country club) or the like.

The user contacts may be received from the contact server 340, the user platforms 345, 350, and/or the memory device 310. In this regard, in some embodiments, the contact receiver 330 may transmit a request for user contacts directly to the user platforms 345, 350, the contact server 340, and/or the memory device 310 in response to the user platforms 345, 350 accessing apparatus 300 or the service 400 including one or more functionalities of apparatus 300. The contact server 340, the user platforms 345, 350, and/or the memory device 310 may respond by transmitting the user contacts and additional associated information back to the contact server 340. Further, the contact receiver 330 (embodied in apparatus 300 and/or the service 400 by incorporation) may perform an authentication, as discussed above, before accessing and/or receiving the information. In some embodiments, user platform 345 or 350 may be embodied as a mobile terminal, such as mobile terminal 10, and the user contacts may be received, directly or indirectly, from the mobile terminal. In other embodiments, the user contacts may be updated on a server, such as the contacts server 340, using a user platform, such as a mobile or non-mobile terminal, and then downloaded from the server onto a different user platform, whereupon the user contacts may be transmitted to the contact receiver 330.

For example, a user (e.g., the user associated with the user platform 345) may access or browse to an online service (e.g., the service 400) that may be a content service provider, using the user platforms 345, whereupon, the online service may request access to the phonebook and/or address book associated with the user, which may include data including user contacts and additional associated information. The online service may include the services of a content service provider or the online service may be the content service provider, as discussed above. Further, and as mentioned above, the interaction of the platform or the user thereof with the service 400 may be regulated by an authentication means.

In embodiments where the user contacts are received from the contacts server 340 or memory device 310, the contacts server 340 and/or the memory device 310 may have previously received the user contacts from a user platform, such as user platforms 345, 350. In this regard, a user may define the user contacts on the user platform and then upload one or more user contacts to the contacts server 340 and/or the memory device 310. For example, a user may define user contacts on a user platform that is embodied as a mobile terminal, such as mobile terminal 10, and upload one or more user contacts from the mobile terminal to the contacts server 340 or memory device 310. Further, the contact receiver 330 (embodied in apparatus 300 and/or the service 400 by incorporation) may perform an authentication, as discussed above, before accessing and/or receiving the information.

Further, user contacts and additional associated information may be received from the service 400. In this regard, the service 400 may be implemented in an embodiment that includes apparatus 300 and one or more of its functionalities, as discussed above and illustrated in FIG. 5. In some embodiments, the service 400 may be an online service which allows a user to store user contacts on a storage device associated with the online service, such as a social networking website that maintains user contacts and additional information associated with one or more users who may have subscribed to the service. For example, the user may subscribe to the social networking site, join or not join a group already existing on the social networking site, and/or create/submit a selection of user contacts to create a virtual social network. The user may create various groups and organize the submitted user contacts into the various groups. As another example, the user may upload a selection of user contacts and additional associated information maintained on a user platform such as the user platforms 345, 350 and/or the contact server 340 onto the social networking site. The user contacts stored on the user platform may be organized according to a preference of the user. The user contacts may be stored on a storage device associated with the service 400, such as the storage device 440. In this regard, the contact receiver 330 may submit a request to the service 400 to access the user contacts associated with a user, for example, stored on the storage device 440. Similarly to the discussion above, the contact receiver 330 (embodied in apparatus 300 and/or the service 400 by incorporation) may perform an authentication before accessing and/or receiving user contacts and additional associated information.

In other embodiments, the service 400 may be an online service that may not provide for the permanent storing of user contacts and/or additional associated information. In this regard, the contact receiver 330 may submit a request to the service 400 to request access to the user contacts associated with a user, for example, stored on a storage device associated with the user platforms 345, 350, or the contact server 340. Similarly to the discussion above, the contact receiver 330 (embodied in apparatus 300 and/or the service 400 by incorporation) may perform an authentication before accessing and/or receiving user contacts and additional associated information.

In yet other embodiments, the service 400 may be an online service that may provide for the sending of communication from one user to another or other interactions between two or more users. As such, the online service may temporarily store the user contact(s) of a user, each time the user communicates or interacts with another user. For example, a user may access a text messaging site with a user platform, such as, the user platform 345, submit a text message to another user, via the online service, such as the service 400, whereupon the online service may temporarily store the contact information of the recipient. Similarly, the user may share an application, via a user platform, such as the user platform 345, with one or more additional users, whereupon the online service may temporarily store the contact information of the one or more users with whom the user is interacting.

The social connection retriever 332 may be configured to retrieve/identify the social connections between each of the user contact(s) associated with a user and the user, and amongst the user contact(s). Means for retrieving/identifying the social connections between each of the user contact(s) and the user, and amongst the user contact(s) may include the processor 305, the social connection retriever 332, algorithms for retrieving/identifying the social connections described herein and executed by one or more of the foregoing components, and/or the like. There may be various social connections between the user contact(s) and the user, and amongst the user contact(s).

Figure 6:
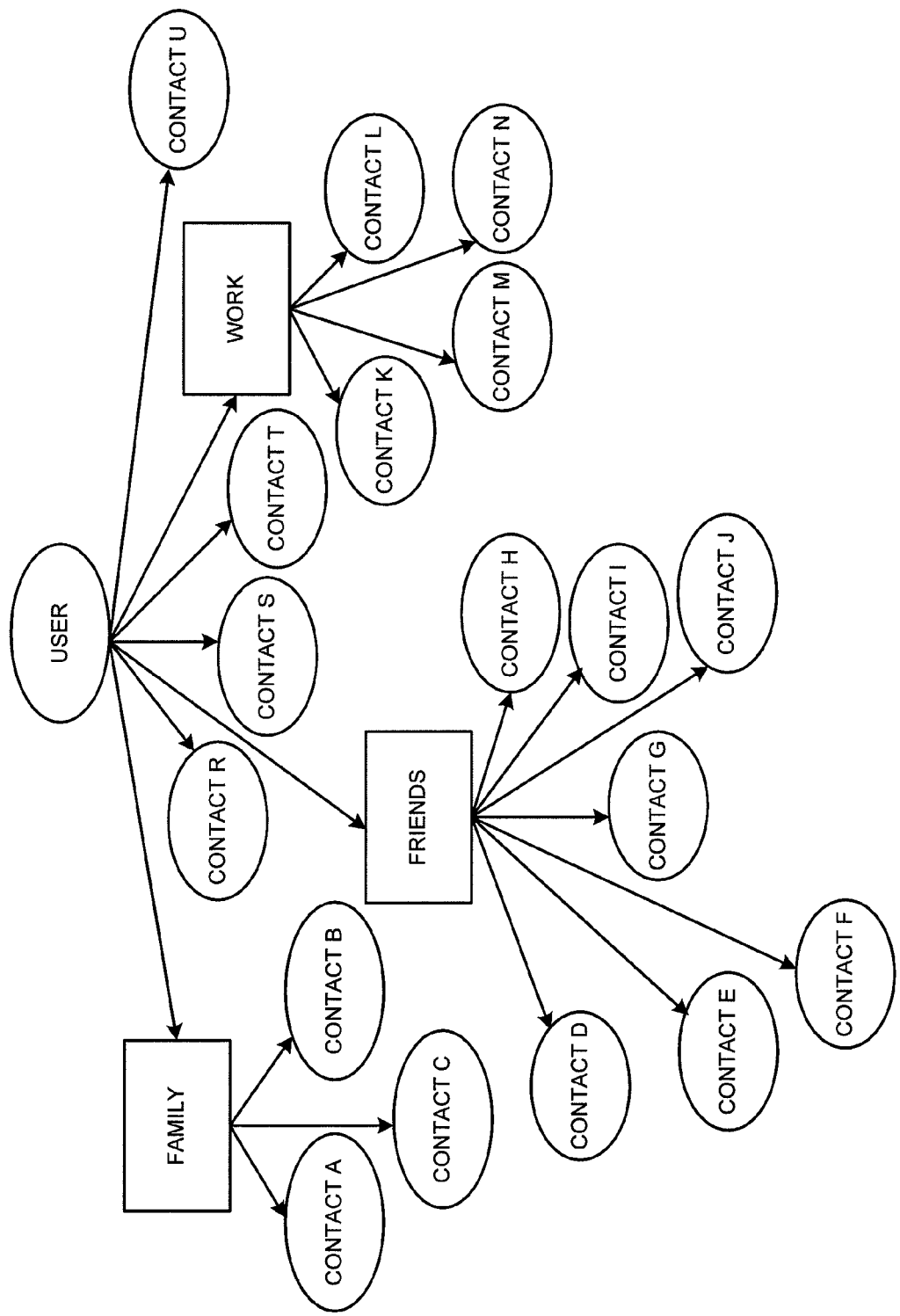
FIG. 6 illustrates an example graph of social connections according to example embodiments of the present invention.

In this regard, and referring now to FIG. 6, an embodiment of a graph of social connections between the user contact(s) and the user, and amongst the user, retrieved/identified by the social connection retriever 332 in accordance with aspects of the present invention is illustrated. As used herein, a "social connection" may be used to refer the social relationship between the user and the user contact or amongst user contacts. For example, the user and the user contact may be friends, family members (i.e., siblings, parent(s) and child (ren)), co-workers, colleagues, acquaintances, members of a particular organization or group, and/or the like. As depicted in FIG. 6, the User may have several contacts, such as for example, Contact A-T. Some of the User's contacts may be organized into groups, such as for example, Family, Friends, and Work. The contacts assigned to various groups may or may not have the same social connections amongst themselves as with the User. For example, although Contact D and Contact E may be friends of the User, they may not be friends with each other. Some of the User's contacts may not be assigned to a group, namely Contact R-U, for various reasons. Contact S may be the spouse or the significant other of the user. Contacts R and U may be new contacts that the User has not had the time to assign to a group. Contact T may be a contact automatically saved by the user platform and as such, the User may be planning on deleting the contact.

Referring back to FIG. 3, in embodiments where the user contacts are not stored on the storage device 310, the social connection retriever 332 may retrieve the social connections between each of the user contact(s) and the user, and amongst the user contact(s) by for example querying the contents of the phone book/address book stored on the user platform or the contact server, subsequent to the contact receiver 330 obtaining access and/or authenticating to the user platform and/or contact server as described above, and identifying the relationships between the user contacts and the user, and amongst the user contacts, as organized on the phone book/ address. In other embodiments where the user contacts are stored on apparatus 300 or on the service 400, the social connection retriever may retrieve the social connections by querying the contents of the storage device storing the user contacts, such as the storage device 310 or 440, subsequent to the contact receiver 330 obtaining access and/or authenticating to the storage device 310 of 440. In other embodiments, the social connections may be obtained from a graph of social connections of the service 400 or apparatus 300. For example, an online service, such as a social networking website, may provide social connections based at least in part on groups (e.g. families, friends, colleagues), organizations (e.g. boat club, cooking club, yoga), and other types of information available on the site to which the user may belong. In some embodiments, some or all the user contact(s) may already be organized by groups and/or categories. For example, the user may have already organized the user contacts on the phonebook/address book or on the social networking website. As such, the social connection retriever 332 may retrieve the social connections as organized.

In other embodiments, the social connection retriever 332 may derive social connections based at least in part on, for example, the user's online usage, and/or the user's pattern of communicating with each of the user contacts based at least in part on, but not limited to, the contents of the phone book/ address book and additional associated information stored on the user platform, such as for example the user platform 345 or 350. As discussed the additional associated information may comprise, but is not limited to, phone calls logs, short message service (SMS) message logs, multimedia messaging service (MMS) message logs, e-mail logs, file sharing logs, application sharing and execution logs, VoIP logs, instant messaging logs, games logs, online gaming event logs, communication events logs and/or the like. The online usage and/or the communications with user contacts may be analyzed to derive social connections. As such, and for example, user contact(s) belonging to the family group may be identified by analyzing the communication event logs and/or the like between the user and the user contact(s), such as emails (for example, the content thereof), appointment privacy flags, photo sharing attributes in online services or the like. As another example, work colleagues may be identified by the exchange of emails (for example, through the content thereof, the frequency, or the like), or the like.

The content generator 334 may be configured to generate a variety of content information and store the generated content information on a storage device such as storage device 310. As such, the user contacts and the content information may be stored on the same storage device. In other embodiments, the content information and user contacts may be stored on separate storage devices but the storage devices may be similar to the storage device 310. Means for generating content information may include the processor 305, the content provider 336, the storage device 310, algorithms for generating content information described herein and executed by one or more of the foregoing components, and/or the like. Each generated content information may include a content type, a usage type, and a sub-usage type. A usage type may refer to the suggested/ recommended function that may be performed by the content information or the purpose the content may be used for such as, but not limited to, ringtone, ringback tone, video tone, wallpaper, theme, alert tone, or the like. A sub-usage type may refer to the suggested/recommended group of user contacts or one or more user contacts to which the content information may be assigned.

Each content information may comprise an indicator that may identify the usage type and/or the sub-usage type. Each usage type and each sub-usage type may have a unique identifier or value. The identifier or value may be, but is not limited to, numerical, alpha or text based, symbols, or the like. For example, but not as a limitation, the indicator may be in the form of a container, may be in the meta-data of the file or media itself, such as but not limited to an ID3 tag, or may be in DRM (Digital Rights Management) headers or the like. In some embodiments, the content generator 334 may be configured to select a file, or a portion thereof, and assign a usage type and/or a sub-usage type. In an alternative embodiment, the content generator 334 may be configured to select a file or content, identify a relevant portion of the file, determine a usage type and/or a sub-usage type for the identified portion, generate a content information comprising the content or the relevant portion thereof and associate a usage type and/or a sub-usage type. As such, the same file or piece of content, in its entirety or various portions thereof, may have different usage types and sub-usage types and hence may be sold or utilized several times, thereby increasing the revenues of a content provider. For example, content information may be generated with a song about mothers, and may be assigned a usage type of ringback tone and a sub-usage type of mothers. Similarly, a portion of the same song about mothers may be assigned a usage type of ringtone and a sub-usage type of wives. Alternatively, the same song, in its entirety or a part of the song, may be assigned a usage type of alert tone and a sub-usage type of mother-in-law. Referring now to FIG. 7 in this regard and as an example, the chorus portion of the song "Erase/Rewind" may be assigned a usage type of ringtone and a sub-usage type of the Marketing group. Similarly, the first verse of the same song, "Erase/Rewind" may be assigned a usage type of alert tone and a sub-usage type of the Marketing II group. In the alternative, the same chorus portion of the song "Erase/Rewind" may be assigned a usage type of ringback tone and a sub-usage type for telemarketers.

Referring back to FIG. 3, in some embodiments, the assignment of sub-usage type and/or usage type may be static. In this regard, the content generator 334 may generate content information with an assigned sub-usage type and/or usage type. As discussed above, the sub-usage type may be the suggested group of user contacts or user contact to which the content may be assigned. The sub-usage type may relate to common social connections such as family, work, business contacts, friends, significant other, and/or the like. In some embodiments, the assignment of sub-usage type and/or usage type may be dynamic. In this regard, the content generator 334 may generate content information with pre-assigned sub-usage type and/or usage type. However, the sub-usage type may be re-assigned to a particular user contact or a particular group of user contacts associated with a user, based at least in part on, for example the social connections of the user contacts associated with the user and additional associated information. For example, the user may receive a selection of one or more content information generated by the content generator 334 with sub-usage type of friends. However, the content generator 334 may re-assign the sub-usage to a particular user contact, namely user contact A, whose social connection to the user, best friend, is related to the pre-assigned sub-usage type of friends. As such, the content generator 334 may generate content information before receiving the user contacts associated with a user and additional associated information. Alternatively, the content generator 334 may generate new content information or modify existing ones based at least in part on the social connections of the user contacts associated with a user and additional associated information after receiving such.

In some embodiments, the content generator 334 may be separate from apparatus 300 and may a service provided by a third party content generator service provider. In this regard, apparatus 300 and the content generator service provider may be implemented in an embodiment similar to that illustrated in FIG. 5, wherein apparatus 300 may a front-end service and the content generator service provider may a back-end service.

The content provider 336 may be configured to provide for content information to the user matching or related to individual user contact(s) or a group of user contact(s) based at least in part on the social connections between the user and the user contact(s) or the group(s), and/or amongst the user contact(s) for download/transfer onto the user platform. Once downloaded or otherwise transferred to the user platform, the content information may be automatically assigned to the user contact(s) or group of user contact(s) without further intervention by the user based at least in part on the usage type and/or the sub-usage type of the content information, as will be discussed in more detail below. As used herein, the term "automatically" may be used to refer to without manual intervention or involvement. Nevertheless, manual intervention or involvement may also be possible. As such, when the user receives communications from the user contact(s) or group of user contact(s), the assigned content information may be retrieved to identify the user contact(s) or group. The one or more content information provided may be recommendations/suggestions by the content provider 336 based at least in part on the social connections. As such, the user would not be overwhelmed with a great amount of content information and may focus on relevant information. Means for providing for content information may include the processor 305, the content provider 336, the storage device 310, algorithms for providing for content information described herein and executed by one or more of the foregoing components, and/or the like. In this regard, the content provider 336 may consider a user contact or a group of user contacts and the associated social connections, consider the content information stored in the storage device 310, compare the content information (type, usage type, sub-usage type) with the social connection (s) associated with the user contact or group of user contacts to identify matching or related content information, and provide for the identified content information directed to or matching the user contact or the group of user contact based at least in part on the social connections to the user. In some embodiments, the content provider 336 may compare the sub-usage type of the content information with the social connection(s) of the user contact(s) or group of user contact (s).

For example, the user may be accessing information which may be related to user contact A on an online service, such as the service 400, using a user platform, such as the user platform 345 or 350. The content provider 336 may consider user contact A and determine that user contact A belongs to the Friends group of the user, based at least in part on the social connections retrieved/identified by the social connection retriever 332. As such, the content provider 336 may compare the stored content information with the social connections associated with user contact A (in this example, friend of the user), retrieve, from a storage device such as the storage device 310, and provide for one or more content information for download/transfer with at least a sub-usage type related to or matching friends and/or friendship, such as, but not limited to, ringtones and/or ringback tones of tunes related to friends, pictures of friends, wallpapers and/or screen savers with friends as a theme, and applications related to friends or the like. The user may then select the one or more content information for download or otherwise transfer to the user platform. Once downloaded or otherwise transferred, the content information may be automatically assigned to the user contact A as a ringtone, ringback tone, video ringtone, wallpaper or theme, or the like, without further intervention by the user after the initiation of the download based at least in part on the usage type and/or the sub-usage type of the content information. Similarly, user contact A may not belong to a particular group and may, for example, be a significant other or spouse of the user. As such, the content provider 336 may compare the stored content information with the social connection(s) of the user contact A (in this example, significant other), retrieve, from a storage device such as the storage device 310, and provide for one or more content information related to significant others or spouses, such as, but not limited to, ringtones and/or ringback tones of tunes related to significant other or spouses, pictures of significant other or spouses, wallpapers and/or screen savers with significant other or spouses as a theme, and application related to significant other or spouses or the like.

In the alternative, the content provider 336 may provide for the content information in a bundle, as illustrated in FIG. 7. In this regard, the content generator may provide for multiple content information with different usage types to be assigned to a user contact or a group of user contacts. For example, the content provider 336 may provide for a ringtone that may be assigned for a user contact along with a corresponding picture, and/or game and/or alert tone, all in one bundle/package, to be downloaded to the user platform.

Content information may be provided to the user in various ways. In some embodiments, all matching or related content information may be provided. In other embodiments, the major categories (i.e., usage types) of matching or related content information may be provided. In this regard, upon selecting a category, all the content information under the category may be listed. The selection of content information may be downloaded to the user platform and automatically assigned to the viewed user contact. In embodiments where the user may have subscribed or belong to an online service maintaining the user contact(s), such as a social networking website, the user may be accessing the information or profile of a user contact associated with the user using the user platform. The content provider 336 may provide for a selection of content information related to or matching the user contact whose profile or information is being accessed by the user. Similarly, the user may also be accessing the information of a group created by the user or a group to which the user belongs. As such, the content provider 336 may provide for a selection of content information matching or relevant thereto to be downloaded and automatically assigned to the group on the user platform.

In embodiments where the user may not have subscribed or not belong to an online service maintaining the user contact (s), such as a social networking website, the user may be accessing information that may relate to or include the name or title of a user contact or a group of user contacts associated with the user. For example, the user may be accessing information on an online service related to the game of chess using the user platform. Moreover, the user may have a selection of user contacts organized into a chess group on the user platform. As such, the content provider 336 may compare the information accessed by the user to the user contacts and identify a chess group in the user contacts. Accordingly, the content provider 336 may provide for a selection of content information related to or matching the user's chess group, such as chess games, chess wallpaper, or the like to be assigned to the user contacts belonging to the chess group. In other embodiments, the user may be sending communications to a user contact or a group of user contacts using an online service via the user platform. For example, the user may be using an online text messaging service to send a text message to a user contact. As such, the content provider may identify the user contact or group of user contacts and the associated social connections, compare the social connections with the stored content information to identify the content information that match or relate to the user contact or group of user contacts based at least in part on the social connections, and provide the identified content information to be assigned to the user contact or group of user contacts.

The content provider 336 may provide for content information in various embodiments. In this regard, the content information may be provided in the form of hypertext link, button, radio button, checkbox, widget or the like, all or some of which may directly activate the download of the content information onto the user platform for automatic assignment. The content provider 336 may be configured to detect the capability or compatibility of the user platform. In this regard, the content provider 336 may detect whether the user platform supports or is not compatible with the automatic assignment of content information functionality. As such, the content provider may provide for an alert to the user platform to notify the user that the user platform does not allow automatic assignment. In some embodiments, the content provider 336 may provide to the user platform for download/transfer an application that enables the user platform to support automatic assignment of content information and then offer the content information for download/transfer. In other embodiments, the content provider 336 may offer the selection of content information for download/transfer but notify the user that the content information may not be automatically assigned. In yet other embodiments, the content provider 336 may not offer the selection of content information for download/transfer.

Referring now to FIG. 8, the system 800 may include a user device 802 and a plurality of remote devices 804 configured to communicate with each other over a network 806. The user device 802 and remote devices 804 may be any computing device capable of communicating with other computing devices. In an example embodiment, one or both of the user device 802 and remote devices 804 may be mobile terminals 10. In other embodiments, the user device 802 may be, for example, the user platforms 345 or 350, while the remote device 804 may be the contact server 340, the apparatus 300, and/or the user platform 345 or 350. The network 806 may be configured to operate similarly to the network 325 of FIG. 3.

The user device 802 may include a processor 808, a memory 810, a communication interface 812, a user interface 814, a communication monitoring unit 816, and an automatic content assignment unit 818. The processor 808, the memory 810, the communication interface 812, and the user interface 814 may be configured to operate similarly to the processor 305, the memory device 310, the communication interface 320, and the user interface 315, respectively, of FIG. 3. The memory 810 may comprise one of a plurality of databases that store information in the form of static and/or dynamic information, for example, in association with mobile terminal context information, internet service context information, user status indicators, user activities, or the like. In this regard, the memory 810 may store, for example, data records describing and/or associated with communication events and/or the like occurring between the user device 802 and the remote device 804. The memory 810 may additionally store a list of contacts of the user of the user device 802, also herein referred to as a "contacts list." This stored information may be stored and/or used by the communication monitoring unit 816 during the course of performing their respective functionalities. The communication interface 812 may be in communication with the memory 810, user interface 814, and communication monitoring unit 816.

The communication monitoring unit 816 may be embodied as hardware, software, firmware, or some combination thereof and may be embodied as or otherwise controlled by the processor 808. In embodiments where the communication monitoring unit 816 is embodied separately from the processor 808, the communication monitoring unit 816 may be in communication with the processor 808. The communication monitoring unit 816 may provide means for monitoring communications with a remote device 804 and for storing a record of communications with a remote device 804. Means for monitoring communications and storing record(s) of communications may include the processor 808, the communication monitoring unit 816, the memory 310, algorithms for monitoring communications and storing record(s) of communications described herein and executed by one or more of the foregoing components, and/or the like. In this regard, the communication monitoring unit 816 may be configured to monitor all incoming and outgoing communications with a plurality of remote devices 804 and to store a record of such communications in memory 810. The communication monitoring unit 816 may be configured for each communication event and/or the like to determine one or more of a communication type (i.e. phone call, sms message, emails, etc), whether the communication was incoming (i.e. received from a remote device 804) or outgoing (i.e. sent or placed to a remote device 804), a time at which the communication event and/or the like occurred, a length of the communication event and/or the like (if applicable), a data quantity and/or bandwidth consumption of the communication event, whether the communication event and/or the like was accepted or rejected, and a remote device 804 with which the communication event and/or the like occurred. In this regard, an accepted communication event and/or the like may be a phone call between a user device 802 and remote device 804 which was answered by the receiving device and thus has a length of time greater than 0 seconds. A rejected communication event and/or the like may be a phone call between a user device 802 and remote device 804 which was not answered by the receiving party either due to missing the phone call or due to purposely ignoring the phone call and thus has an identical start and end time and thus a total call length of 0 seconds.

The communication monitoring unit 816 may be configured to store a record of each communication event and/or the like. Such a record may comprise at least some of the above-mentioned information that may be determined about the communication event and/or the like. For example, the communication monitoring unit 816 may be configured to store records of communication events and/or the like in association with a remote device 804 and/or a user of a remote device 804. Such records may be stored, for example, in association with a contact in a contacts list of the user device 802, phone number, media access control (MAC) address, IP address, and/or e-mail address associated with the remote device 804. In this regard, the communication monitoring unit 816 may be configured, for example, to store for each contact in a contacts list of the user device 802 a plurality of listings (also referred to as "tables" or "sheets") comprising records of communication events and/or the like with the remote device 804 of the contact. The communication monitoring unit 816 may be configured to store one listing of communication events and/or the like for each type of communication with the contact. In this regard, the communication event records and/or the like stored by the communication monitoring unit 816 may correspond to the additional information associated with the user contacts discussed above, such as, but not limited to, phone calls log, emails and/or other communications log or the like The automatic content assignment unit 820 may be embodied as hardware, software, firmware, or some combination thereof and may be embodied as or otherwise controlled by the processor 808. In embodiments where the automatic content assignment unit 820 is embodied separately from the processor 808, the automatic content assignment unit 820 may be in communication with the processor 808. The automatic content assignment unit 820 may include or otherwise be in communication with a content type detector unit 822, a content usage type detector unit 824, a content usage type detector unit 826, and an assigning unit 828. Means for automatically assigning content may include the processor 808, the automatic content assignment unit 816, the memory 310, algorithms for automatically assigning content described herein and executed by one or more of the foregoing components, and/or the like.

As discussed above, a selection of content information may be provided to the user for download. The content information may be received from various sources such as, but not limited to an online service, another user device, a server, and/or the like. Once downloaded or otherwise transferred to the user device, the automatic content assignment unit 820 may process the one or more downloaded content information and automatically assign the one or more downloaded content information to the user contact(s) or group of user contact(s) without further intervention by the user, based at least in part on the usage type and/or the sub-usage type of the content information. As such, when the user receives communications from the user contact(s) or a member of the group of user contact(s), the assigned content information may be retrieved to identify the user contact(s) or group. For example, once downloaded or otherwise transferred, content information may be automatically assigned to a user contact A as a ringtone, ringback tone, video ringtone, wallpaper or theme, or the like, without further intervention by the user after the initiation of the download based at least in part on the usage type and/or the sub-usage type of the content information. In other embodiments, the one or more downloaded content information may be automatically assigned as default to perform a function based at least in part on the usage type. For example, the one or more downloaded content information may be automatically assigned as a default ringtone, ringback tone, video call tone and/or the like. Content information may be automatically assigned immediately after download/transfer, after a time predetermined by the user or the user platform, or upon the user platform prompting the user to determine whether to proceed with the automatic assignment. In the event the content information is not automatically assigned immediately or shortly after download/transfer, the content may be temporarily stored on a storage device. The storage device may be internal to user platform, such as the memory 810, or external thereto, in which, the storage device may be locally or remotely available, via, for example, a network.

The content type detector unit 822 may be embodied as any device or means embodied in either hardware, software, or a combination of hardware and software that is configured to receive and/or transmit data from/to a network and/or any other device or module in communication with the automatic content assignment unit 820. Means for detecting content type may include the processor 808, the automatic content assignment unit 816, the memory 310, algorithms for detecting content described herein and executed by one or more of the foregoing components, and/or the like. The content type detector unit 822 may, for example, identify the type of the content information by examining the contents of a file and/or message. For example, a music file may be identified as music by analyzing the contents of the file.

The content usage type detector unit 824 may be embodied as any device or means embodied in either hardware, software, or a combination of hardware and software that is configured to receive and/or transmit data from/to a network and/or any other device or module in communication with the automatic content assignment unit 820. Means for detecting content usage type may include the processor 808, the automatic content assignment unit 816, the memory 310, algorithms for detecting content described herein and executed by one or more of the foregoing components, and/or the like. The content usage type detector unit 824 may locate the indicator of the content information, retrieve the usage type for the indicator, detect and identify the usage type of the content information. As discussed above, the indicator may be in the form of a container, the meta-data of the content, or the DRM headers. As such, the content usage type detector unit 824 may retrieve the usage type for the container, the meta-data of the content, or the DRM headers, depending on the form of the indicator. As discussed above, each usage type may have a unique identifier or value. The identifier or value may be, but not limited to, numerical, alpha or text based, symbols, or the like, or a mixture thereof. The content usage type detector unit

824 may maintain, in a data structure, a selection of the unique identifier or value and their corresponding usage type, and use this selection of unique identifier or value to identify the usage type. For example, a value of 1 may correspond to ringtone while a value of C may correspond to alert one. In the alternative, the usage type may simply indicate, for example, "video ringtone". As such, upon retrieving the value or identifier of the usage type of the download content information, the content usage type detector unit 824 may match the value or identifier and determine the usage type. The content usage type detector unit 824 may communicate the determined usage type to the assigning unit 828.

The content sub-usage type detector unit 826 may be embodied as any device or means embodied in either hardware, software, or a combination of hardware and software that is configured to receive and/or transmit data from/to a network and/or any other device or module in communication with the automatic content assignment unit 820. Means for detecting content sub-usage type may include the processor 808, the automatic content assignment unit 816, the memory 310, algorithms for detecting content described herein and executed by one or more of the foregoing components, and/or the like. Similarly to the content usage type detector unit 824, the content sub-usage type detector unit 826 may locate the indicator of the content information, retrieve the sub-usage type for the indicator, detect and identify the sub-usage type of the content information. As discussed above, each sub-usage type may have unique identifier or value. The identifier or value may be, but not limited to, numerical, alpha or text based, symbols, or the like, or a mixture thereof. The content sub-usage type detector unit 826 may maintain, in a data structure, a selection of the unique identifier or value and their corresponding sub-usage type, and use this selection of unique identifier or value to identify the usage type. For example, a value of 4 may correspond to friends while a value of A may correspond to colleagues. In the alternative, the usage type may simply indicate, for example, "chess group". As such, upon retrieving the value or identifier of the usage type of the download content information, the content sub-usage type detector unit 826 may match the value or identifier and determine the sub-usage type. The content sub-usage type detector unit 826 may communicate the determined sub-usage type to the assigning unit 828.

The assigning unit 828 may be embodied as any device or means embodied in either hardware, software, or a combination of hardware and software that is configured to receive and/or transmit data from/to a network and/or any other device or module in communication with the automatic content assignment unit 820. Means for assign content may include the processor 808, the automatic content assignment unit 816, the memory 310, algorithms for detecting content described herein and executed by one or more of the foregoing components, and/or the like. The assigning unit 828 may receive the information pertaining to the usage type and/or sub-usage type from the content usage and/or sub-usage type detector units 824 and 826, or retrieve that information from the units. Upon receipt or retrieval of the usage and sub-usage types, the assigning unit may assign the content information to the content information to the appropriate user contact(s) or group of user contact(s) to perform the appropriate function. For example, the assigning unit may assign the chorus of a song to the marketing group to perform the function of ringtone. In some embodiments, before proceeding with the automatic assignment, the assigning unit 828 may determine whether the same determined usage type has not already been assigned for the determined sub-usage. For example, the assigning unit may determine whether the marketing group does already have a ringtone. In the event the same determined usage type has already been assigned, the assigning unit may notify the user of the situation immediately upon download/transfer or at some later time, in which event the content may be stored in a storage device, as discussed above. In some embodiments, the user may request a replacement of the currently assigned content or a cancellation of the assignment. For example, the user may choose to proceed and replace the current ringtone of the marketing group or cancel the automatic assignment process and retain the current ringtone. In other embodiments, the assigning unit 828 may automatically proceed and replace the currently assigned content. In yet other embodiments, the assigning unit 828 may automatically cancel the assigning process. Similarly, and referring now to FIG. 3, the content provider 336 may also detect whether the user contact(s) or group(s) already have assigned content information based at least in part on the user contacts and the additional associated information.

Referring back to FIG. 8, in some embodiments, multiple content information may be assigned to the same user contact (s) or group of user contact(s) so long as the content information are of a different usage type, as discussed. For example user contact A may be assigned a ringtone, a ringback tone, a picture, and wall paper. However, user contact A may not be assigned two ringtones or two ringback tones, etc. As another example, the content may be offered in a bundle, such as, for example, a ringtone and a picture. In some embodiments, the assigning unit 828 may automatically assign each content information separately, one at a time. In other embodiments, the assigning 828 may automatically assign the content information simultaneously.

FIGS. 9 and 10 are flowcharts of a system, method, and program product according to example embodiments of the invention. It will be understood that each block, step, or operation of the flowcharts, and combinations of blocks, steps or operations in the flowcharts, may be implemented by various means, such as hardware, firmware, and/or software including one or more computer program code portions, program instructions, or executable program code portions. For example, one or more of the procedures described above may be embodied by computer program code instructions. In this regard, the computer program instructions which embody the procedures described above may be stored by a memory device of the apparatus and executed by a processor in the apparatus. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block (s), step(s), or operation(s). These computer program instructions may also be stored in a computer-readable memory that may direct a computer, a processor, or other programmable apparatus to function in a particular manner, such that the instructions stored in the computer-readable memory produce an article of manufacture including instruction means which implement the function specified in the flowcharts block(s), step(s), or operation(s). The computer program instructions may also be loaded onto a computer, processor, or other programmable apparatus to cause a series of operational steps to be performed on the computer, processor, or other programmable apparatus to produce a computer-implemented process such that the instructions which execute on the computer, processor, or other programmable apparatus provide steps for implementing the functions specified in the flowcharts block(s), step(s), or operation(s).

Accordingly, blocks, steps, or operations of the flowcharts support combinations of means for performing the specified functions, combinations of steps for performing the specified functions and program instruction means for performing the specified functions. It will also be understood that one or more blocks, steps, or operations of the flowcharts, and combinations of blocks, steps, or operations in the flowcharts, may be implemented by special purpose hardware-based computer systems which perform the specified functions or steps, or combinations of special purpose hardware and computer instructions.

In this regard, one example embodiment of a method for providing content information as illustrated in FIG. 9 may include maintaining content information at 900. The content information may be maintained on a server or the like. In some embodiments, each content information may include a usage type and/or a sub-usage type of the content information. In other embodiments, the usage type and/or the sub-usage type may be included in an indicator. Each usage type and each sub-usage type may have unique identifier or value. The identifier or value may be, but is not limited to, numerical, alpha or text based, symbols, or the like.

The example method of FIG. 9 may further include receiving a selection of user contacts associated with a user at 910. The selection of user contacts may be received directly from a user platform, such as a mobile terminal. The selection of user contacts may also be received a contact server. In this regard, the contact server may have received the user contacts from one or more user platforms, one of which may have been a mobile terminal.

The example method of FIG. 9 may also include querying the selection of user contacts to identify the social connections associated with the user contacts at 920. In some embodiments, each user contact may have at least one social connection with the user. In other embodiments, each user contact may also have a social connection with at least one other user contact.

The example method of FIG. 9 may additionally include comparing the content information with the social connection of a user contact to identify content information corresponding to the user contact at 930. In some embodiments, the usage type and/or the sub-usage type of each content information may be compared to the social connection(s) of a user to identify content information corresponding to the user contact. In other embodiments, the sub-usage type of each content information may be compared.

The example method of FIG. 9 may further include providing for a transmission of the identified content information at 940.

An example embodiment of a method for automatically assigning content information as illustrated in FIG. 10 may include receiving content information at 1000. In some embodiments, each content information may include a usage type and/or a sub-usage type of the content information. In other embodiments, the usage type and/or the sub-usage type may be included in an indicator. The content information may be received at a user platform, such as a mobile terminal.

The example method of FIG. 10 may further include identifying the usage type and/or the sub-usage type of the content information at 1010. In some embodiments, the usage type and/or sub-usage type of the content information may be identified based at least in part on their respective unique identifier or value. In other embodiments, the usage type and/or sub-usage type may be identified based at least in part on their respective textual value.

The example method of FIG. 10 may also include assigning the content information to a user contact, based at least in part on the sub-usage type, to perform a specified function, based at least in part on a usage type. In some embodiments, multiple content information may be automatically assigned one at a time, based at least in part on a specified or arbitrary order. In other embodiments, multiple content information may be automatically assigned simultaneously.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    maintaining a selection of content information, wherein content information comprises a usage type and a sub-usage type, wherein the usage type comprises a recommended function that is performed by the content information, and wherein the sub-usage type comprises one or more user contacts to which the content information is assigned;
    receiving a selection of user contacts associated with a user;
    querying the selection of user contacts to identify social connections associated with the user contacts, wherein each user contact has at least one social connection with the user;
    comparing the selection of content information with at least one social connection of at least one user contact to identify at least one content information corresponding to the at least one user contact; and
    providing for a transmission of the at least one identified content information to the user.

2. The method of claim 1, wherein comparing the selection of content information with at least one social connection of at least one user contact is based at least in part on the usage type and the sub-usage type of the at least one identified content information and the social connection of the at least one user contact.

3. The method of claim 1, wherein receiving a selection of user contacts comprises receiving information related to the selection of user contacts comprising phone communications log, short message service (SMS) messages logs, multimedia messaging service (MMS) messages logs, e-mails logs, file sharing logs, application sharing logs, VoIP logs, instant messaging logs, or other events logs.

4. The method of claim 1, wherein receiving a selection of user contacts comprises receiving a selection of user contacts from a server maintaining a selection of user contacts associated with a user.

5. The method of claim 1, wherein receiving a selection of user contacts comprises receiving a selection of user contacts from at least one electronic device.

6. A method comprising:
  receiving at least one content information to be automatically assigned to at least one user contact, wherein the content information comprises an indicator for a usage type and a sub-usage type, wherein the usage type comprises a recommended function that is performed by the content information, and wherein the sub-usage type comprises one or more user contacts to which the content information is assigned;
  identifying the usage type and the sub-usage type of the at least one content information; and
  automatically assigning the received at least one content information to the at least one user contact, based at least in part on the sub-usage type, to perform a specified function, based at least in part on a usage type.

7. The method of claim 6, wherein the usage type is selected from a group comprising ringtone, ringback tone, alert tone, video caller id, picture caller id, themes, screen savers, or application.

8. The method of claim 6, wherein the sub-usage type is selected from a group comprising friends, family, work, and business contacts.

9. The method of claim 6, wherein automatically assigning the received at least one content information comprises automatically assigning the received at least one content information to a group of user contacts.

10. The method of claim 6, wherein receiving at least one content information comprises receiving at least one content information from an online service provider.

11. The method of claim 6, wherein at least one content information comprises receiving at least one content information from at least one electronic device.

12. A computer program product comprising at least one non-transitory computer-readable storage medium having computer-readable program code portions stored therein, the computer-readable program code portions comprising:
  a first program code portion configured to maintain a selection of content information, wherein content information comprises a usage type and a sub-usage type, wherein the usage type comprises a recommended function that is performed by the content information, and wherein the sub-usage type comprises one or more user contacts to which the content information is assigned;
  a second program code portion configured to receive a selection of user contacts associated with a user;
  a third program code portion configured to query the selection of user contacts to identify social connections associated with the user contacts, wherein each user contact has at least one social connection with the user;
  a fourth program code portion configured to compare the selection of content information with at least one social connection of at least one user contact to identify at least one content information corresponding to the at least one user contact; and
  a fifth program code portion configured to provide for a transmission of the at least one identified content information to the user.

13. The computer program product of claim 12, wherein the fourth program code portion being configured to compare the selection of content information with at least one social connection of at least one user contact is based at least in part on the usage type and the sub-usage type of the at least one identified content information and the social connection of the at least one user contact.

14. The computer program product of claim 12, wherein the second program code portion being configured to receive a selection of user contacts comprises being configured to receive information related to the selection of user contacts comprising phone communications logs, short message service (SMS) messages logs, multimedia messaging service (MMS) messages logs, e-mails logs, file sharing logs, application sharing logs, VoIP logs, instant messaging log, or other events logs.

15. The computer program product of claim 12, wherein the second program code portion being configured to receive a selection of user contacts comprises being configured to receive a selection of user contacts from a server maintaining a selection of user contacts associated with a user.

16. The computer program product of claim 12, wherein the second program code portion being configured to receive a selection of user contacts comprises being configured to receive a selection of user contacts from at least one electronic device.

17. An apparatus comprising at least one processor and at least one memory including computer program code, the at least one memory and the computer program code configured to, with the processor, cause the apparatus to at least:
  maintain a selection of content information, wherein content information comprises a usage type and a sub-usage type, wherein the usage type comprises a recommended function that is performed by the content information, and wherein the sub-usage type comprises one or more user contacts to which the content information is assigned;
  receive a selection of user contacts associated with a user;
  query the selection of user contacts to identify social connections associated with the user contacts, wherein each user contact has at least one social connection with the user;
  compare the selection of content information with at least one social connection of at least one user contact to identify at least one content information corresponding to the at least one user contact; and
  provide for a transmission of the at least one identified content information to the user.

18. The apparatus of claim 17, wherein the processor being configured to cause the apparatus to compare the selection of content information with at least one social connection of at least one user contact is based at least in part on the usage type and the sub-usage type of the at least one identified content information and the social connection of the at least one user contact.

19. The apparatus of claim 17, wherein the processor being configured to cause the apparatus to receive a selection of user contacts comprises being configured to receive information related to the selection of user contacts comprising phone communications logs, short message service (SMS) messages logs, multimedia messaging service (MMS) messages logs, e-mails logs, file sharing logs, application sharing logs, VoIP logs, instant messaging logs, or other events log.

20. The apparatus of claim 17, wherein the processor being configured to cause the apparatus to receive a selection of user contacts comprises being configured to receive a selection of user contacts from a server maintaining a selection of user contacts associated with a user.

21. The apparatus of claim 18, wherein the processor being configured to cause the apparatus to receive a selection of user contacts comprises being configured to receive a selection of user contacts from at least one electronic device.

22. An apparatus comprising at least one processor and at least one memory including computer program code, the at least one memory and the computer program code configured to, with the processor, cause the apparatus to at least:

receive at least one content information to be assigned to at least one user contact, wherein the content information comprises an indicator for a usage type and a sub-usage type, wherein the usage type comprises a recommended function that is performed by the content information, and wherein the sub-usage type comprises one or more user contacts to which the content information is assigned;

identify the usage type and the sub-usage type of the at least one content information; and automatically assign the received at least one content information to the at least one user contact, based at least in part on the sub-usage type, to perform a specified function, based at least in part on a usage type.

23. The apparatus of claim 22, wherein the usage type is selected from a group comprising ringtone, ringback tone, alert tone, video caller id, picture caller id, themes, screen savers, or application.

24. The apparatus of claim 22, wherein the sub-usage type is selected from a group comprising friends, family, work, and business contacts.

25. The apparatus of claim 22, wherein the processor being configured to cause the apparatus to automatically assign the received at least one content information comprises being configured to automatically assign the received at least one content information to a group of user contacts.

26. The apparatus of claim 22, wherein the processor being configured to cause the apparatus to receive at least one content information comprises being configured to receive at least one content information from at least one electronic device.

* * * * *